US010863856B2

(12) United States Patent
Fletcher et al.

(10) Patent No.: US 10,863,856 B2
(45) Date of Patent: Dec. 15, 2020

(54) BEVERAGE PREPARATION WITH PRESSURIZED LIQUID

(71) Applicant: Lavazza Professional North America, LLC, West Chester, PA (US)

(72) Inventors: Paul Fletcher, Basingstoke (GB); David Knowles, Basingstoke (GB); Mark Thompson, Basingstoke (GB); Philip Mould, Basingstoke (GB); Peter Austin, Basingstoke (GB)

(73) Assignee: Lavazza Professional North America, LLC, West Chester, PA (US)

( * ) Notice: Subject to any disclaimer, the term of this patent is extended or adjusted under 35 U.S.C. 154(b) by 651 days.

(21) Appl. No.: 15/521,155

(22) PCT Filed: Oct. 23, 2015

(86) PCT No.: PCT/GB2015/053194
§ 371 (c)(1),
(2) Date: Apr. 21, 2017

(87) PCT Pub. No.: WO2016/063087
PCT Pub. Date: Apr. 28, 2016

(65) Prior Publication Data
US 2017/0340160 A1    Nov. 30, 2017

(30) Foreign Application Priority Data
Oct. 23, 2014    (GB) .................................. 1418881.7

(51) Int. Cl.
*A47J 31/36*        (2006.01)
(52) U.S. Cl.
CPC ......... *A47J 31/3623* (2013.01); *A47J 31/369* (2013.01)

(58) Field of Classification Search
CPC ...... A47J 31/36; A47J 31/369; A47J 31/3623; A47J 31/3604; A47J 31/3676; A47J 31/3685
(Continued)

(56) References Cited

U.S. PATENT DOCUMENTS

| 5,526,733 A | * | 6/1996 | Klawuhn | ............ | A47J 31/0663 |
| | | | | | 99/287 |
| 5,840,189 A | | 11/1998 | Sylvan et al. | | |

(Continued)

FOREIGN PATENT DOCUMENTS

| EP | 0179641 A2 | 4/1986 |
| EP | 0247841 A2 | 5/1986 |

(Continued)

OTHER PUBLICATIONS

International Search Report from International Application No. PCT/GB2015/053194 dated Apr. 7, 2016.

*Primary Examiner* — Lorne E Meade
*Assistant Examiner* — Ayub A Maye
(74) *Attorney, Agent, or Firm* — The Belles Group, PC

(57) ABSTRACT

A beverage preparation apparatus for preparation of a beverage from a capsule in a clamp assembly (30). The clamp assembly has a first clamp member (31) and a second clamp member, where the inner surfaces of the first clamp member and the second clamp member form a clamp chamber (33) for substantially enclosing and supporting a capsule (10) during beverage preparation. The second clamp member comprises a rigid peripheral frame (32) having a central void and a resilient layer (37) extending across said central void. There is a piston (36) positioned in the central void and resiliently coupled to the peripheral frame (32) to allow limited resilient movement of the rigid peripheral frame (32) relative to the piston (36).

15 Claims, 16 Drawing Sheets

(58) Field of Classification Search
USPC .............................. 99/300, 302 R, 302 P, 301
See application file for complete search history.

(56) References Cited

U.S. PATENT DOCUMENTS

| | | | | |
|---|---|---|---|---|
| 6,240,832 | B1* | 6/2001 | Schmed | A47J 31/3623 |
| | | | | 221/121 |
| 6,739,240 | B2* | 5/2004 | De Koning | A47J 31/36 |
| | | | | 99/283 |
| 2009/0114100 | A1* | 5/2009 | Spinelli | A47J 31/0668 |
| | | | | 99/289 R |
| 2010/0189859 | A1* | 7/2010 | Blanc | A47J 31/3633 |
| | | | | 426/394 |
| 2011/0000376 | A1 | 1/2011 | Kooijker et al. | |
| 2011/0027425 | A1 | 2/2011 | Heijdel et al. | |
| 2011/0142996 | A1 | 6/2011 | Kruger | |
| 2012/0031281 | A1* | 2/2012 | Denisart | A47J 31/3676 |
| | | | | 99/295 |
| 2015/0265091 | A1* | 9/2015 | Flick | A47J 31/3633 |
| | | | | 426/112 |
| 2017/0086619 | A1* | 3/2017 | Bolognese | F04B 17/03 |

FOREIGN PATENT DOCUMENTS

| | | |
|---|---|---|
| EP | 0272922 A2 | 6/1988 |
| EP | 0468079 A1 | 1/1992 |
| EP | 0512468 A1 | 11/1992 |
| EP | 0521186 A1 | 1/1993 |
| EP | 0710462 A1 | 5/1996 |
| EP | 0821906 A1 | 2/1998 |
| GB | 2121762 A | 1/1984 |
| GB | 2122881 A | 1/1984 |
| JP | H04 142266 A | 5/1992 |
| WO | 90/01449 A1 | 2/1990 |
| WO | 93/17932 A1 | 9/1993 |
| WO | 94/01344 A1 | 1/1994 |
| WO | 94/02059 A1 | 2/1994 |
| WO | 99/05044 A1 | 2/1999 |
| WO | 01/60220 A1 | 8/2001 |
| WO | 02/19875 A1 | 3/2002 |
| WO | 2007/093355 A1 | 8/2007 |
| WO | 2012/175985 A1 | 12/2012 |

* cited by examiner

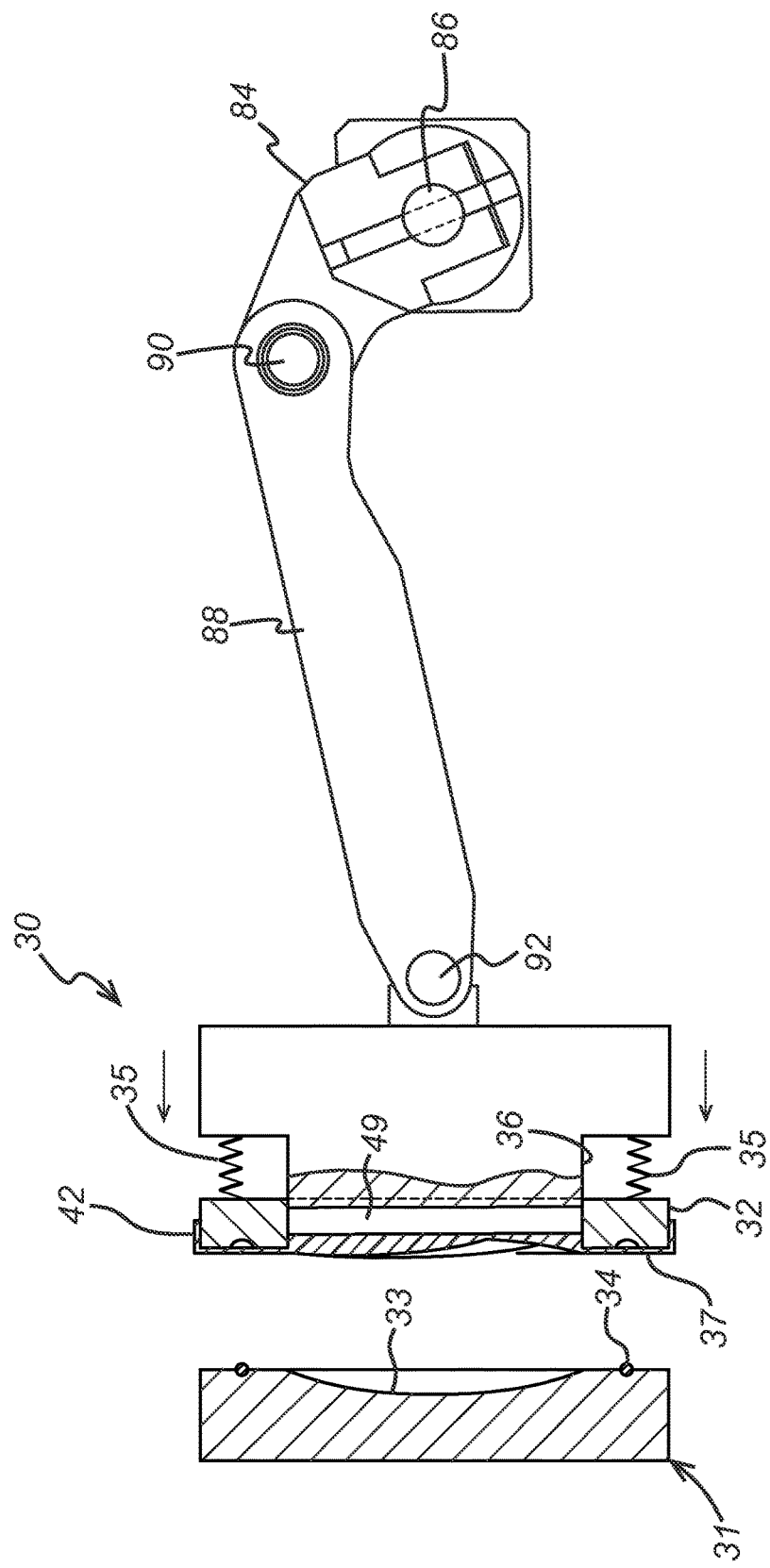

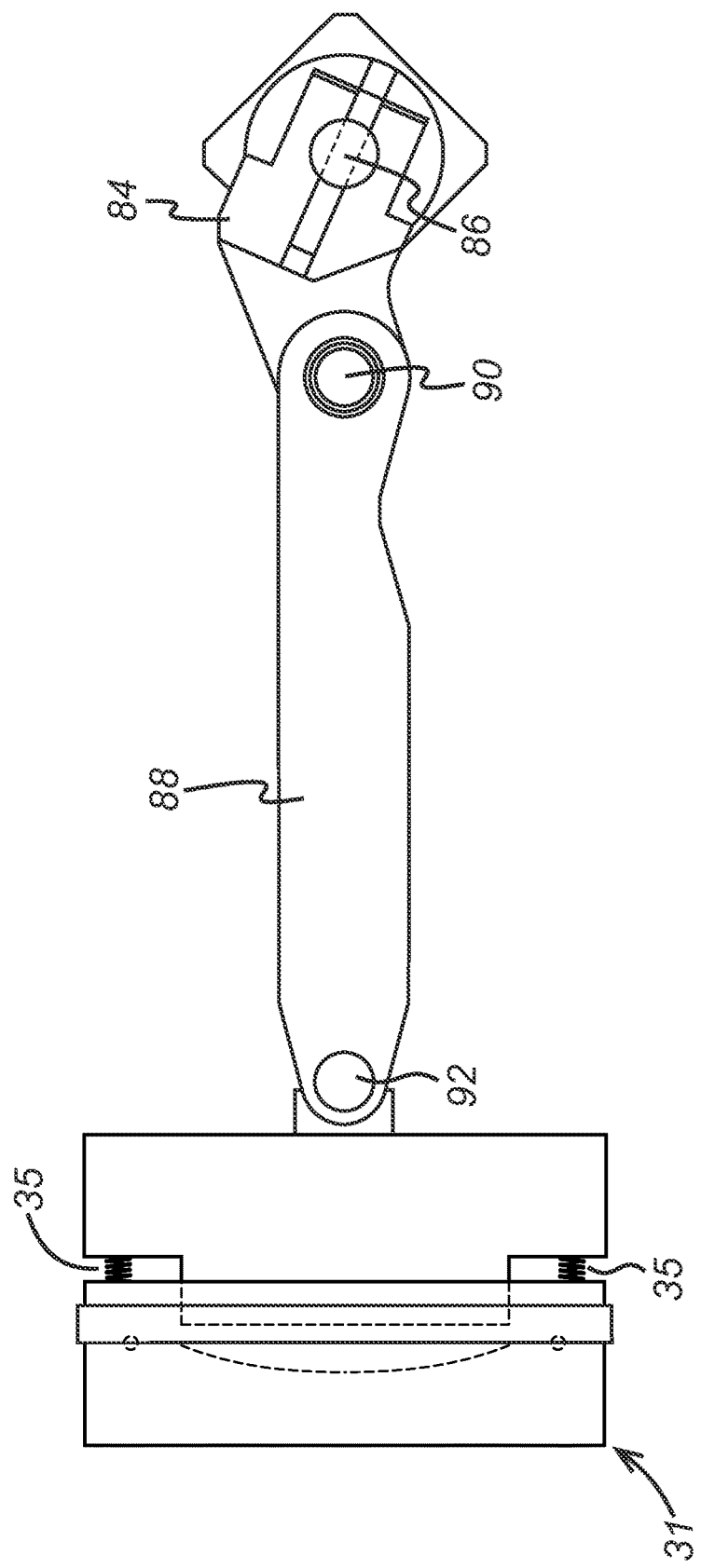

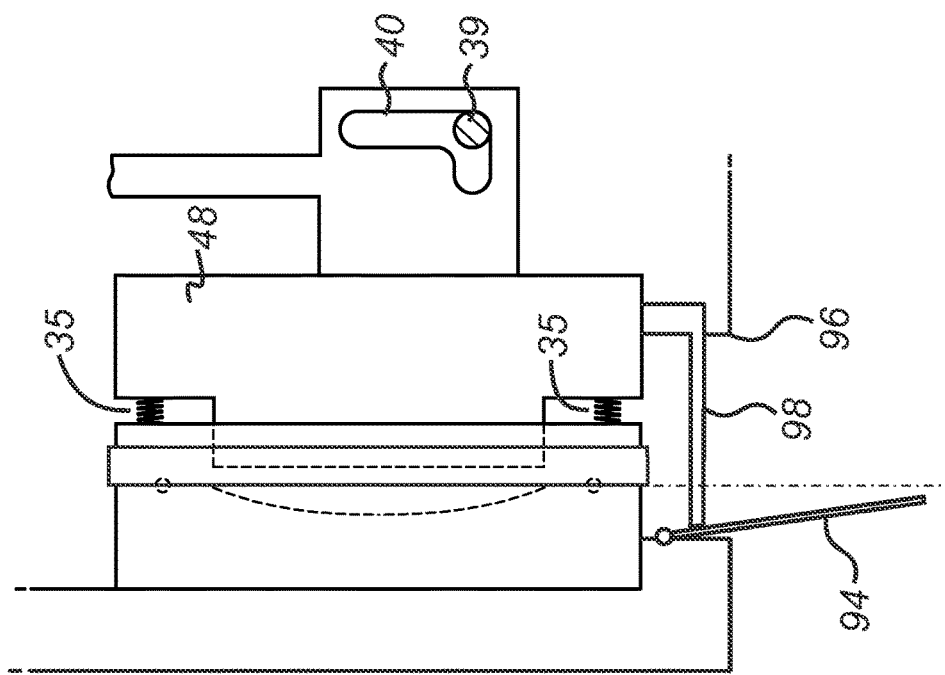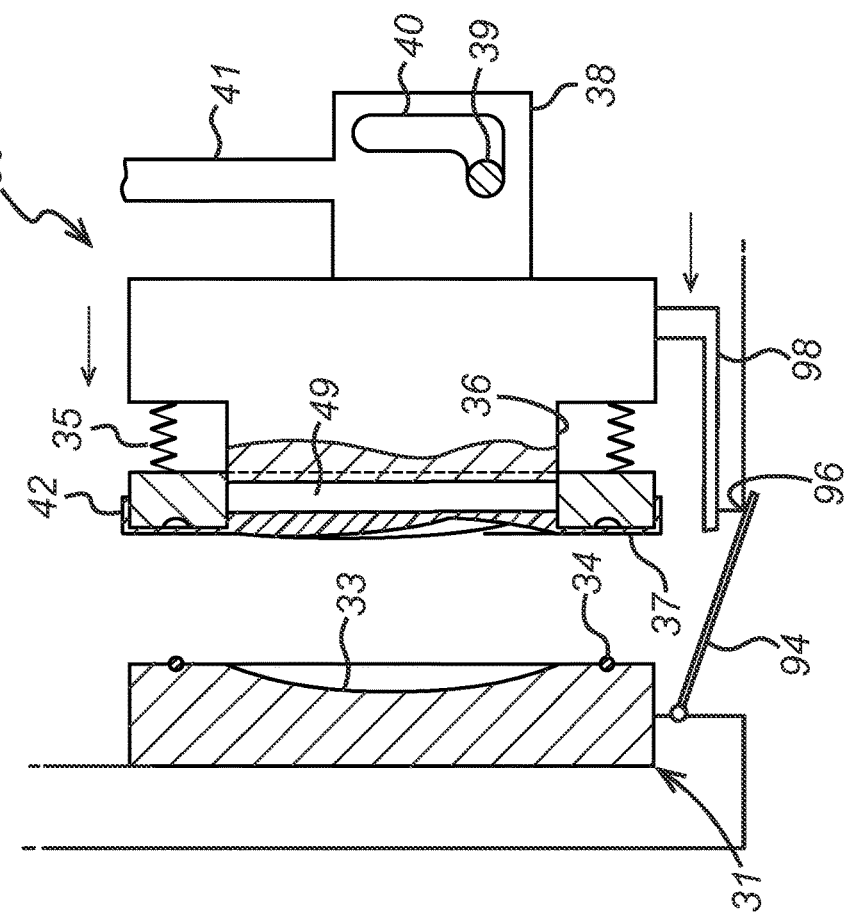

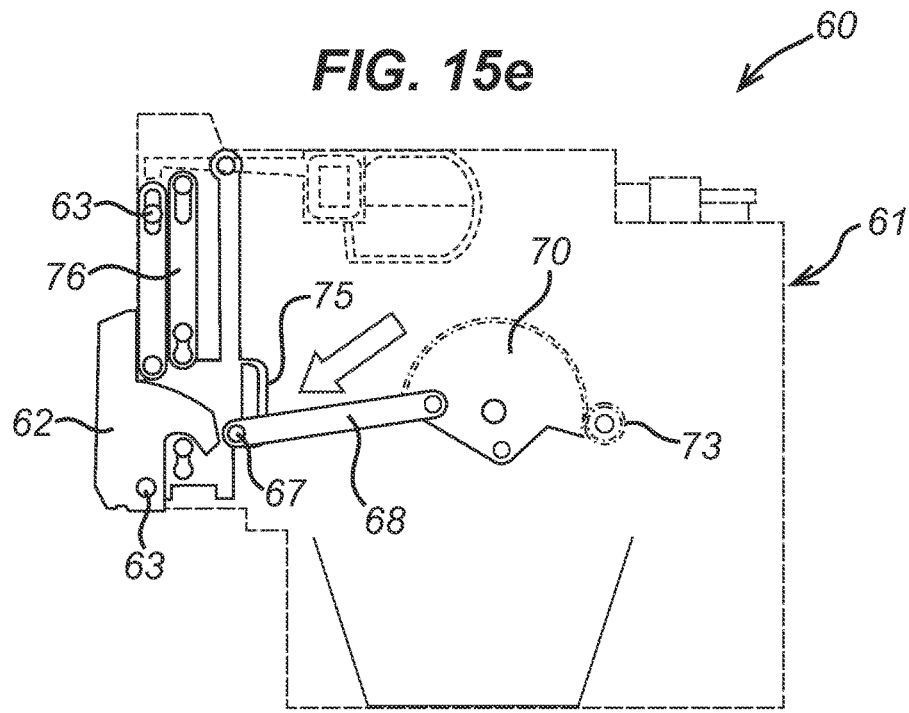
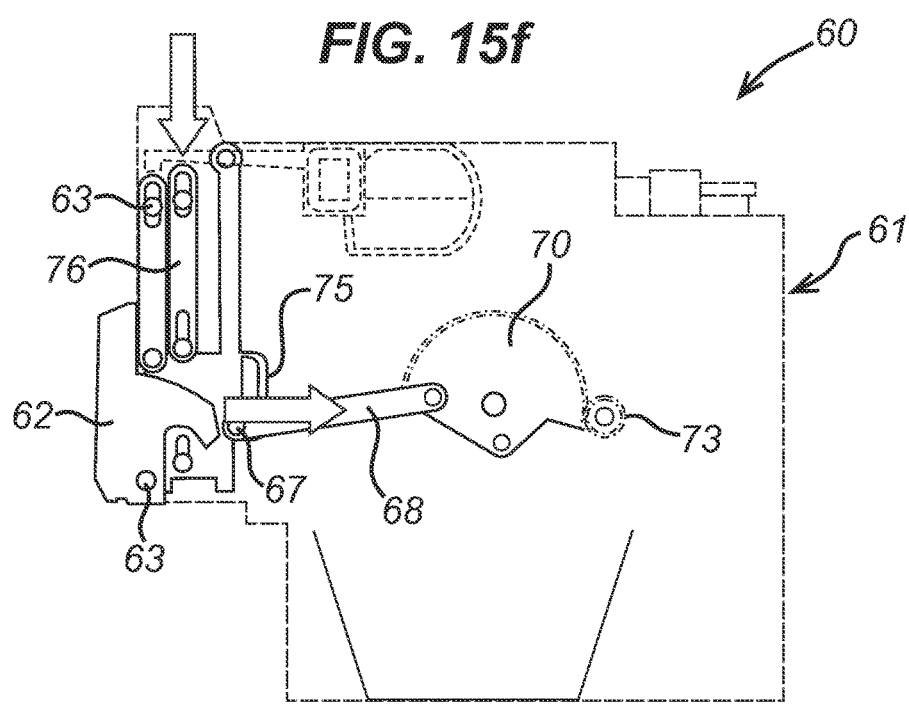

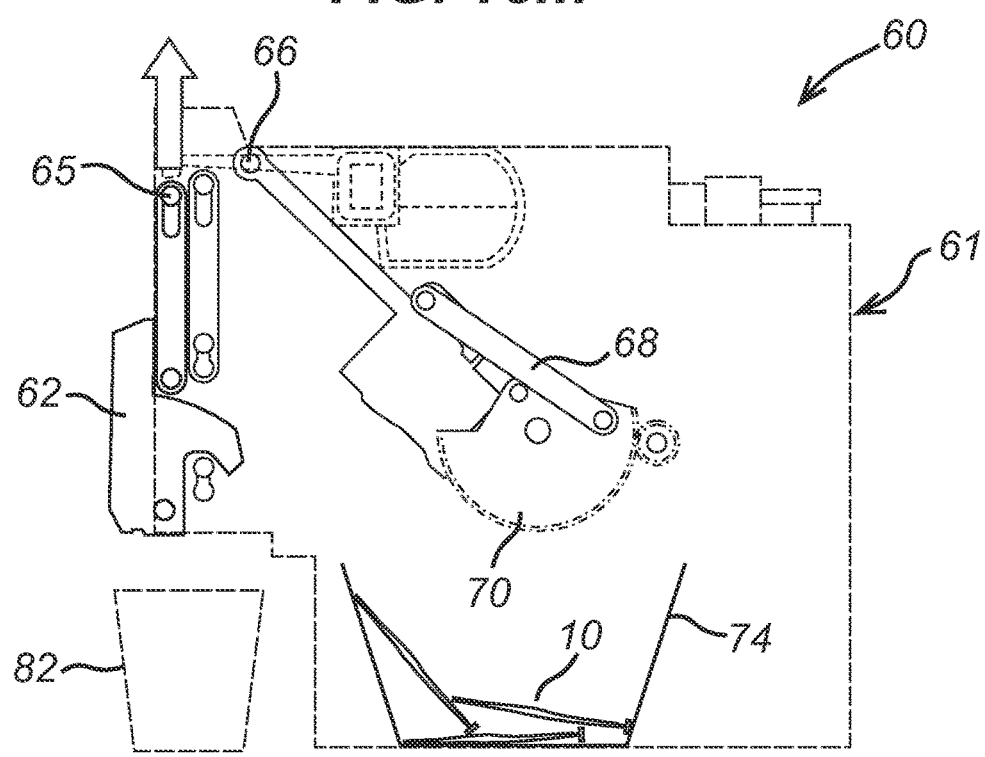

BEVERAGE PREPARATION WITH PRESSURIZED LIQUID

RELATED APPLICATIONS

This application is a national phase filing under 35 USC 371 of International Application No. PCT/GB2015/053194, filed on Oct. 23, 2015, which claims priority of British Patent Application No. 1418881.7, filed on Oct. 23, 2014, the entirety of which are incorporated herein by reference for all purposes.

TECHNICAL FIELD

The present invention relates to capsules, apparatus and methods for the preparation of beverages by injecting water under high pressure into capsules containing a beverage preparation ingredient.

BACKGROUND

Beverage making systems are known in which the beverage is made by inserting a capsule containing a particulate beverage making ingredient, such as ground coffee, into a beverage making station of a beverage making apparatus. The apparatus then injects water into the capsule, where the beverage making ingredient dissolves in, or infuses into, the water to form the beverage. The beverage flows out of the capsule through a suitable outlet, which may be simply an opening or perforation in the capsule, or it may comprise an outlet tube that pierces an outlet region of the capsule. The capsule may incorporate a filter to prevent passage of solid components such as coffee grounds out of the capsule. Beverage making systems of this general type are described for example in WO94/01344, EP-A-0512468 and EP-A-0468079 (all Nestle), in U.S. Pat. No. 5,840,189 and WO-A-0160220 (Keurig), in EP-A-0272922 (Kenco), in WO-A-2007093355 (Samar Technologies), in US-A-20110142996 (Kruger), EP-A-0710462 (Illycaffe), and in EP-A-0821906, US-A-20110000376 and US-A-20110027425 (Sara Lee).

GB-A-2121762, GB-A-2122881, EP-A-0179641, EP-A-0247841 and WO-A-9905044 describe capsule-based beverage preparation systems of the type that are now widely used and marketed by Mars Drinks under the registered trade mark FLAVIA®. An exemplary embodiment of a FLAVIA® capsule according to the state of the art is shown in FIGS. 1, 2a and 2b. Similar capsules are described in JP-A-4142266.

Referring to FIGS. 1, 2a and 2b, an exemplary FLAVIA®-type beverage preparation capsule 100 comprises front and back sheets 110, 112 of a liquid- and air-impermeable sheet material permanently bonded together around their top and side edges as described in more detail below. The front and back sheets are also bonded together along a bottom edge 120 of the capsule, but this bond is releasable under the effect of heat or pressure inside the capsule. For example, the bonding of the bottom edge 120 may be by means of a pressure-sensitive adhesive. Within the capsule 100 is a folded web of filter material 130 bonded to the inside walls of the front and back sheets. The web of filter material supports a beverage preparation ingredient 150, such as ground coffee or leaf tea. The capsule 100 further comprises a nozzle 140 having tubular bore 142. The nozzle is inserted into the top edge of the capsule and bonded in airtight fashion to the front and back sheets, the nozzle being flanged to assist in locating the capsule 100 correctly with a beverage preparation machine. The nozzle bore is initially sealed by a suitable airtight freshness barrier.

In use, the capsule 100 is introduced into a FLAVIA® dispensing machine, which comprises a clamp to grip the nozzle under the flange, and a hollow injector tube with a mechanism to insert the hollow injector tube into the nozzle bore, thereby piercing the freshness barrier. The dispensing machine further comprises a source of hot water and a pump to inject the hot water through the injector tube into the capsule. Upon introduction of the hot water through the injector tube and the nozzle bore, the beverage preparation ingredient 150 contained in the capsule 100 is mixed with the hot water and a beverage is brewed. The bottom seam 120 of the capsule 100 opens under the effect of heat and liquid pressure, and the beverage passes through the filter web 130 and the open bottom of the capsule and is collected in a receptacle located at a receptacle station situated directly below the capsule.

Referring to FIG. 2a, the sheet of web material 130 is folded to form a W in cross-section supporting the infusible beverage preparation ingredient 150. Upon introduction of liquid through the liquid conduct, the liquid pressure causes the apex 132 of the W to evert to provide a downwardly convex filter bed as shown in FIG. 2b. The eversion effect assists in the rupture of the pressure-sensitive seal of the bottom seam 120 to dispense a beverage brewed in the capsule. Further details and advantages of the everting filter webs may be found in EP-A-0179641. The FLAVIA® capsules and method provide beverages of superior quality, and furthermore provide the advantage of avoiding cross-contamination of the beverage preparation apparatus by successive beverages because the beverage does not contact any part of the apparatus after preparation.

Current beverage dispensing systems of the FLAVIA® type are adapted to prepare beverages by injection of hot water at only slightly elevated pressures, for example less than 1 bar gauge pressure. The capsules are not designed to operate at higher pressures. In particular, injection of water at higher pressures could cause the filter to separate from the pack. However, the preparation of certain premium beverages, in particular espresso coffee, requires water to be passed through the coffee bed at a pressure greater than 5 bar and up to about 20 bar. A need therefore remains for capsules, apparatus and beverage preparation methods for the preparation of espresso coffee and other high-pressure extraction beverages that also give the above-identified benefits of quality and no cross-contamination.

It is also known to brew individual portions of espresso coffee from individual capsules of ground coffee. The capsules typically contain a portion of ground coffee, tightly compacted in a capsule having a frustoconical or oblate spheroid shape and formed from air- and moisture-impermeable material. The capsule is inserted into a rigid, metal brewing chamber that is normally shaped to fit around the capsule tightly. The brewing chamber has a filter element in its base, means to pierce the underside of the capsule, and means to inject hot water at a pressure of 500-1500 kPa (5-15 bar) into the interior of the capsule to brew espresso coffee. Espresso coffee brewing capsules and systems of this type are described, for example, in WO93/17932 and WO94/02059.

A drawback of existing espresso brewing capsules is that they are adapted for use with conventional espresso machines that have a rigid brewing cavity dimensioned to receive a bed of coffee of specific dimensions and to apply the necessary pressure to such a bed of coffee. There is limited scope for varying the amount of coffee in the capsule, or for varying the degree of compaction of the coffee bed during brewing. A further drawback of the existing espresso systems is cross contamination between the successive brews, since the beverage exiting the capsule passes through, and therefore contaminates, the base part of the brewing chamber.

EP-A-0521186 describes a capsule containing a compressed beverage brewing ingredient, such as ground coffee, for use in espresso-type machines. The capsule is deformable to assume the shape of the cavity of whichever espresso machine it is used in. This removes the need for a special adapter to adapt existing espresso machines to the exact shape and configuration of the capsule. Unfortunately, it also means that the coffee in the capsule may be insufficiently compacted for optimal espresso coffee brewing. The problem of cross-contamination by successive brews also exists for this configuration.

EP-A-0821906 describes methods of beverage brewing in which a vacuum pack containing a beverage brewing ingredient is placed in a clamp, hot water is injected into the vacuum pack through a hollow needle, and the brewed beverage is allowed to escape through a closing seam in the vacuum pack. The pack includes a movable plate opposite the closing seam of the vacuum pack that is used to compress the vacuum pack in the clamp before brewing. The plates making up the brewing cavity are rigid, flat plates. These plates cannot apply high pressure to squeeze the vacuum pack without risk of bursting the pack.

WO-A-0219875 describes an apparatus for the brewing of a beverage by transmission of an aqueous fluid through a capsule (capsule) containing a beverage brewing ingredient, said apparatus comprising: one or more injectors to inject the aqueous fluid into the capsule during said brewing; and a clamp for the capsule, said clamp comprising one or more members that are movable to open and close the clamp, said members having inner surfaces which in a closed position of the clamp define a cavity adapted to substantially enclose and support the capsule during said brewing and further adapted to define a beverage exit pathway in a lower part of the cavity, and wherein the inner surface of at least one clamp member comprises at least one deformable region mounted on a support that is movable while the clamp is in said closed position, whereby the shape of said cavity or said exit pathway can be changed while the clamp is in said closed position to provide a desired brewing configuration of the capsule. The capsule is suitably a capsule of the FLA-VIA® type, optionally with modifications.

WO-A-2012175985 describes a beverage preparation capsule containing a beverage preparation ingredient for the preparation of beverages by injecting water under pressure. The capsule comprises a body having side walls formed from one or more substantially air- and liquid-impermeable sheet materials defining a chamber containing a beverage preparation ingredient and further defining an outlet channel having an upstream end in fluid communication with the chamber for escape of beverage from said chamber, wherein at least a region of the outlet channel is filled by a filtration material for filtering the beverage escaping from said chamber. Suitably, the filtration material is in the form of two or more stacked layers of filtration sheet, for example formed from a single filter sheet having first and second edges bonded to opposite side walls of the body above the outlet channel, respectively, the sheet being V-folded or W-folded between the side walls to form said stacked layers in the outlet channel.

FIGS. 3 and 4, show a capsule as described in WO20121751585. The capsule 150 is formed from front and back sheets 151,152 of flexible sheet material bonded together by a permanent heat (or ultrasonic) seal along side edges 153,154 and top edge 155. An injection nozzle 156 is bonded between the front and back sheets in the center of top edge 155 in air-tight fashion. A permanent heat seal 170 also extends transversely across the capsule spaced from the bottom of the capsule to define the bottom of the beverage ingredient chamber 162 but with a central gap defining an outlet channel 157, as shown in dashed lines in FIG. 3. The beverage ingredient chamber is substantially filled with an ingredient 175, such as ground coffee. The permanent heat seal further comprises curved downward extensions 158, 159 on either side of the longitudinal axis of the capsule below the outlet channel 157 defining the lateral edges of the downstream chamber 160. The bottom edge 161 of the capsule is sealed with a linear heat-releasable adhesive seal providing a freshness barrier prior to use of the capsule. The width of the downstream chamber is intermediate the width of the beverage ingredient chamber 162 and the narrower outlet channel 157.

A filter in the outlet channel 157 is provided by a single, rectangular sheet of filter material 171 that is V-folded with opposed edges 172,173 bonded to the inside of the front and back sheets 151,152, respectively in similar fashion to the bonding of the filter sheet in the prior art capsules of FIGS. 1-2. The edges 172,173 are bonded to the inside of the front and back sheets 151,152 at a location well above the outlet channel 157. The V-folded filter sheet extends downwardly through the outlet channel 157, with the bottom 174 of the V located within the downstream chamber 160. The outlet channel 157 is thereby filled by a double thickness of filter sheet material. It is noted that the V-strip of filter material extends across substantially the whole width of the pack, whereby in regions where the V-folded filter sheet overlaps the permanent heat seal, the permanent heat seal is formed through the V-folded filter sheet so that the front and back sheets 151,152 and the V-folded filter sheet 171 are all bonded together. This is facilitated by the use of a filter sheet containing thermoplastic fibers, such as polypropylene fibers. However, the filter sheet is not bonded to the front and back faces in the outlet region, nor does it extend into the releasable seal region 161 at the bottom of the pack.

In use, the beverage preparation capsule of FIGS. 3 and 4 is inserted into a clamp assembly of a beverage preparation apparatus such that an outlet of the capsule is pinched between the clamp members in the outlet region to provide a flow restriction at the outlet and maintain high back pressure inside the capsule body. Water at pressures of 5-15 bar is injected into the capsule in the inlet region to produce a beverage in the capsule; and the beverage escapes through the outlet region.

Channelling of liquid through the compressed bed of beverage preparation material during brewing may occur when preparing beverages using capsule-based (i.e. capsule-type) systems, especially where relatively high pressures are required such as in the preparation of espresso and espresso-type beverages. This channelling directs the liquid through preferred pathways in the compressed bed of beverage preparation material preventing uniform exposure of the beverage preparation material to the liquid and resulting in wasted beverage preparation material and a beverage having reduced concentration of dissolved or infused material. Channelling may occur in particular if the beverage ingredient is not uniformly and/or sufficiently compressed in the clamp prior to and during water injection.

The present inventors have also found that the bonding of the V-filter edges 172,173 at locations above the outlet channel 157 as shown in FIGS. 3 and 4 results in leakage of liquid through the filter above the outlet channel, and therefore to incomplete extraction of the coffee, especially of the coffee located near the bottom of the beverage ingredient chamber.

It will also be appreciated that, for typical capsules of the above types having a brewing zone of area 25 cm$^3$ to 50 cm$^3$ and at a brewing pressure of about 10 bar gauge or more, a force of the order of 5000N may be exerted on the clamp of the beverage preparation apparatus during brewing. This requires a clamp having high dimensional stability and strength under such forces, combined with ease of opening and access before and after brewing. It is also desirable that the clamp should provide optimal compression (tamping) of the coffee bed inside the capsule before brewing, and further that it should be capable of squeezing the pack after brewing to dewater the pack before disposal and to reduce drips.

Accordingly, a need remains for improved capsules, apparatus and methods for preparing beverages from capsules, especially at high pressures such as for producing espresso and espresso-type beverages from flexible capsule-type packs.

SUMMARY OF THE INVENTION

In a first aspect, the present invention provides a beverage preparation capsule containing a beverage preparation ingredient, the beverage capsule comprising: front and back sheets of substantially air- and liquid-impermeable flexible film materials, the sheets being bonded together in face to face relation along a top edge, first and second side edges, and a bottom edge, wherein a region of the bonding in the bottom edge is releasable by heat and/or pressure to allow escape of beverage from the capsule during beverage preparation; the front and back sheets further being bonded together in face to face relation by a transverse seal extending intermediate the top and bottom edges, the transverse seal being interrupted by a gap, whereby the gap provides fluid communication between a beverage ingredient chamber located above the gap and a beverage outlet chamber located below the gap; and a folded filter strip extending transversely across the capsule to provide a filter element in the gap, the folded filter strip having a fold extending transversely below the transverse seal and front and back side panels extending upwardly through the transverse seal and bonded to the front and back sheets of the capsule, respectively, wherein the front and back side panels do not extend more than about 10 mm into the beverage ingredient chamber above the transverse seal.

Suitably, the folded filter sheet is a simple V-folded filter strip, with the vertex of the V located below the transverse intermediate seal in the capsule, and the side edges of the V extending into, or slightly above the transverse seal. However, it is possible that more complex folded strips such as W-folded strips could be used. It has been found that the provision of a V-strip filter that does not extend significantly, or at all, above the intermediate transverse seal and therefore the outlet channel provides improved flow of liquid through the ingredient bed in the ingredient chamber during beverage preparation. Suitably, the front and back side panels of the folded filter strip do not extend more than about 5 mm into the beverage ingredient chamber above the transverse seal, more suitably they do not so extend by more than about 2 mm. Suitably, the width of the folded strip (top to bottom in the capsule) is from about 15 mm to about 25 mm. Thus, for a V-folded strip this corresponds to an unfolded edge-to-edge width of from about 30 mm to about 50 mm.

Suitably, the bottom edge of the folded filter strip, e.g. the vertex of the V-strip filter, is bonded into the bottom edge seal of the capsule. This has been found to improve opening of the bottom edge seal during beverage preparation. Both reliability and cleanliness of opening and the audible "pop" when the pack opens are surprisingly enhanced by this feature.

Suitably, the capsules of the invention further comprise a liquid injection nozzle having a tubular bore sealed by a freshness barrier, wherein the nozzle is sealed in airtight fashion in the top edge between the front and back sheets.

Suitably, the front and back sheets are bonded together across part of the width of the capsule between the intermediate transverse seal and the bottom seal to define the outlet chamber between the front and back sheets having a width less than the width of the ingredient chamber.

Suitably, the capsule consists essentially of the front and back sheets, the filter strip, optionally the nozzle, and the ingredient. Suitably, the capsule is a single-serve capsule. It may suitably be a disposable, single-use capsule.

Suitably, the gap and outlet chamber are located in an axially central region of the capsule, and the outlet chamber has a width of from about 20% to about 70% of the width of the beverage ingredient chamber. The capsule suitably has substantial mirror symmetry about the longitudinal median line.

The gap defining the outlet channel from the beverage ingredient chamber suitably has a width of from about 5 mm to about 25 mm, for example from about 8 mm to about 15 mm.

In a second aspect, the present invention provides a beverage preparation apparatus for preparing a beverage by injection of pressurized water into a capsule wherein the capsule has at least one flexible wall, said beverage preparation apparatus including a clamp assembly operable between an open configuration and a closed brewing configuration for beverage preparation, said clamp assembly comprising: a first clamp member having a recess in an inner wall thereof for receiving part of a capsule; a second clamp member, said second clamp member comprising a rigid peripheral frame having a central void, and a resilient layer extending across said central void, whereby a front surface of said resilient layer defines a second inner wall for receiving part of a capsule, wherein respective inner walls of said first and second clamp members in said closed brewing configuration define a chamber for substantially enclosing and supporting a capsule during beverage preparation; and a piston positioned in the central void of the rigid frame, said piston comprising a piston face for abutting a back surface of said resilient layer and a piston body, wherein said piston is resiliently coupled to said rigid peripheral frame to allow limited resilient movement of said rigid frame relative to said piston along a direction of closure of the clamp.

The flexible wall of the capsule is a wall that is deformable by the apparatus and so allow the clamp members of the apparatus to manipulate and rearrange, i.e. compress, the capsule contents.

The direction of closure is defined by the path along which the clamp members travel when moving from the open configuration to the closed brewing configuration.

Suitably, the piston is supported on an arm that is pivotingly connected to a chassis of the apparatus whereby the piston can be swung away from the first clamp member about an axis substantially perpendicular to the direction of closure of the clamp when the clamp is unlocked.

Suitably, the apparatus comprises a drive mechanism coupled to the piston to drive the second clamp member into the closed position against the first clamp member. The drive mechanism may be disengaged from the piston when the clamp is locked. In these embodiments, the drive mechanism suitably includes a slot in the piston, the slot extending away from the piston face in the direction of closure of the clamp, and a drive pin received in the slot, whereby the drive pin can be retracted within the slot at the closed and locked position of the clamp to disengage the drive mechanism from the piston.

Suitably, the apparatus comprises a drive mechanism for closing the clamp, the mechanism comprising: a crank arm having a first end coupled to the piston and a second end coupled to a toothed crankshaft, wherein the crank axle is mounted to the chassis of the apparatus and extends substantially perpendicular to the direction of closure of the clamp, and wherein the toothed crankshaft is driven by a toothed drive wheel coupled to an electric motor.

The inner surface of the resilient region may comprise a concave base surface for receiving the capsule and one or more pressure pads projecting from the concave base surface for selectively constricting one or more regions of a capsule held in the clamp. For example, the pressure pads may comprise or consist of one or more elongate pressure pads extending in a direction generally from an inlet region of the clamp towards an outlet region of the clamp. Suitably, one or more of the pressure pads are of a substantially arcuate transverse and/or longitudinal cross section in the absence of an external force.

The beverage preparation apparatus may comprise a locking mechanism, as described hereinbelow. A locking mechanism may comprise: at least one first locking pin projecting from a side of the first clamp element; at least one second locking pin projecting from a side of the piston; and a movable locking gate having a first flange for abutment against the first locking pin in the closed and locked position (when the locking mechanism is in its closed brewing configuration), and a second flange for abutment against the second locking pin in the closed and locked position, wherein the locking gate is movable when the clamp is closed from an unlocked position (open configuration) at which the flanges do not engage the pins to a locked position (closed brewing configuration) in which the flanges engage opposite sides of the first and second pins, respectively, to prevent the first and second pins from moving apart while allowing the first and second pins to move towards each other.

Suitably, a plurality of respective pairs of pins are provided on opposite sides of the first clamp member and the piston. This locks the clamp elements together at multiple locations to ensure uniform stresses on the clamp elements and locking elements.

Suitably, the piston comprises a peripheral flange extending behind the rigid frame, and the resilient coupling between the piston body and the second clamp member comprises a plurality of springs spaced around the periphery of the rigid frame and the piston flange, whereby relative movement of the piston towards or away from the rigid frame respectively compresses or extends the springs about a zero-displacement relative position.

The beverage making apparatus according to the present invention typically further comprises: a cup receiving station for locating a cup to receive beverage prepared in the clamp, and a water jet nozzle located above the cup receiving station to direct a jet of water into a cup in the cup receiving station. In these embodiments the control system and user display are programmed to offer a user a choice between a homogeneous beverage such as latte and an inhomogeneous beverage such as cappuccino. If a uniform beverage is selected, then the control system is programmed to inject water into the beverage in the cup after beverage preparation in the clamp assembly to swirl and mix the beverage in the cup.

The apparatus may further comprise a capsule recognition device and a control system and display programmed to interrupt beverage preparation and to indicate to a user when a capsule of the wrong type has been inserted in the clamp assembly.

The apparatus of the invention may further comprise a cup receiving station for locating a cup to receive beverage prepared in the clamp, wherein the cup receiving station comprises a cup detection apparatus comprising an infrared transmitter and an infrared receiver located such that a cup positioned in the receiving station interrupts an infrared beam between the infrared transmitter and the infrared receiver to detect the presence of a cup in the cup receiving station, wherein the apparatus control and user display are programmed to perform the following steps when the cup detection apparatus does not detect a cup in the cup receiving station: (a) interrupt beverage preparation, and (b) prompt the user to perform one of the following options: either (i) insert a cup into the cup receiving station, or (ii) override the cup detection function.

The beverage preparation apparatus according to the present invention is preferably suitable for preparing a beverage from a capsule according to the present invention. Suitably, the clamp assembly is configured to pinch the outlet channel of the capsule when the clamp assembly is closed and locked around the capsule, and the bottom edge of the capsule extends outwardly from the clamp to prevent contamination of the clamp by the beverage escaping from the capsule.

The apparatus of the invention suitably further comprises an injector tube for injecting water into a capsule held inside the clamp assembly, and a pump for pumping the water through the injector at a pressure greater than about 5 bar gauge, for example at about 10 bar gauge.

In these embodiments, the beverage preparation apparatus suitably further comprises a second clamp assembly suitable for beverage preparation from a capsule at pressures less than about 2 bar gauge, a second injector tube for injecting water into a capsule held inside the second clamp assembly, and a pump for pumping the water through the second injector tube at a pressure less than about 2 bar gauge, wherein the apparatus comprises a single control system and user interface to control beverage preparation from both clamp assemblies. The second clamp etc. may for example be substantially the same as for existing low-pressure FLA-VIA systems. The two clamps in these embodiments are suitably mounted in a single housing. The apparatus according to these embodiments offer the user a choice between high-pressure brewed beverages such as espresso coffee, and low-pressure brewed beverages such as filter coffee or tea. Moreover, the low pressure clamp can be used to prepare a milk component of a multi-component beverage from a suitable milk concentrate capsule, optionally with foaming, to which an espresso "shot" can be added from the high pressure clamp.

Thus, the control system and display may be programmed to prompt a user to carry out the following sequential steps in response to a command to brew a multicomponent beverage:

(a) insert a first capsule containing a first beverage brewing ingredient into one of the clamps;

(b) wait while a first beverage component is brewed from the first capsule;

(c) transfer a receptacle from a cup receiving station of the one clamp to a cup receiving station of the other clamp (d) insert a second capsule containing a second beverage brewing ingredient into the holder of the other clamp; and (e) wait while a second beverage component is brewed from the second capsule.

Accordingly, in a further aspect the present invention provides a beverage preparation system comprising: a beverage preparation apparatus according to the invention having first and second beverage preparation clamps; a plurality of beverage preparation capsules of a first type for use in a first beverage preparation clamp of the apparatus; and a plurality of beverage preparation capsules of a different type for use in the second beverage preparation clamp of the apparatus.

The capsules according to the present invention may not be ideal for use in low pressure clamps such as conventional FLAVIA clamps. Similarly, conventional FLAVIA capsules such as those shown in FIGS. 1 and 2 may not be ideal for use in the high pressure brewing clamps of the present invention. Therefore, the system according to the invention suitably includes apparatus to prevent misuse of capsules of the wrong type in the respective clamps. This apparatus may be a capsule recognition system as identified above, or one of the following.

For instance, the first clamp incorporates a first key way and the second clamp comprises a second key way different from the first key way, wherein the first key way permits insertion of a first capsule type comprising a first nozzle configuration through the first clamp key, and the second key way permits insertion of a second capsule type comprising a second nozzle configuration through the second clamp key way. This provides a simple mechanical interface to prevent misuse of capsules in the wrong clamp.

Alternatively, the first clamp incorporates a first nozzle colour sensor and the second clamp comprises a second nozzle colour sensor, and wherein the first capsule type comprises a nozzle having a first colour, and the second capsule type comprises a nozzle having a second colour.

In a further aspect, the present invention provides a method of making a beverage comprising inserting a beverage preparation capsule having a beverage preparation ingredient in a beverage ingredient chamber of the capsule into the clamp assembly of a beverage preparation apparatus according to the invention such that an outlet channel from a beverage ingredient chamber of the capsule is pinched between the clamp members; securing the clamp assembly in the closed brewing configuration; injecting water at a pressure of from about 5 to about 15 bar gauge into the beverage ingredient chamber of said capsule to produce a beverage in said capsule; and allowing said beverage to escape from the capsule and the clamp through said outlet channel.

Suitably, the method comprises the steps of: inserting the capsule into the clamp; securing the first clamp member in a fixed position; followed by moving the second clamp member towards the first clamp member until the resilient layer on the rigid frame of the second clamp member abuts against a periphery of the first clamp member; followed by further moving the piston towards the first clamp member to force the resilient layer further towards the first clamp member to compress the beverage ingredient inside the capsule; followed by said step of injecting said water into the beverage ingredient chamber to prepare the beverage; followed by moving the second clamp member away from the first clamp to open the clamp for removal of the spent capsule.

In a further aspect of the present invention, there is provided a beverage preparation apparatus for preparing a beverage by injection of water into a capsule comprising: a first brewing section configured to hold a capsule containing a beverage brewing ingredient, wherein the first brewing section comprises a first door that is moveable between a closed position and an open position for accepting the capsule into the first brewing section; a second brewing section configured to hold a capsule containing a beverage brewing ingredient, wherein the second brewing section comprises a second door that is moveable between a closed position and an open position for accepting the capsule into the second brewing section; at least one source of hot liquid; at least one injector (and preferably wherein an injector is provided for each brewing section), wherein an injector is suitable for injecting hot liquid into a capsule held in a brewing section to brew a beverage component in the capsule; and a control system for opening each of the first door and second door, wherein the control system is programmed to open the first door in response to a first command inputted by a user and to open the second door in response to a second command inputted by a user.

DESCRIPTION OF THE DRAWINGS

Further details and specific embodiments of the present invention will now be described further, by way of example, with reference to the accompanying drawings, in which:

FIG. 9 shows a schematic side elevation view of a clamp assembly and drive mechanism according to the present invention in an open configuration;

FIG. 10 shows a schematic side elevation view of the clamp assembly and drive mechanism of FIG. 9 in the closed brewing configuration;

FIG. 11 shows a schematic side elevation view of a finger guard of the present invention in a blocking configuration;

FIG. 12 shows a schematic side elevation view of the finger guard of FIG. 11 in a non-blocking configuration;

FIGS. 15a to 15m show schematic side elevation views partially cut away of a beverage preparation apparatus according to the invention showing steps in the preparation of a beverage from a capsule of the invention;

FIG. 17b shows a top plan view of the nozzle of FIG. 17a;

FIG. 18b shows a top plan view of the nozzle of FIG. 18a;

DETAILED DESCRIPTION OF THE INVENTION

Figure 2B:
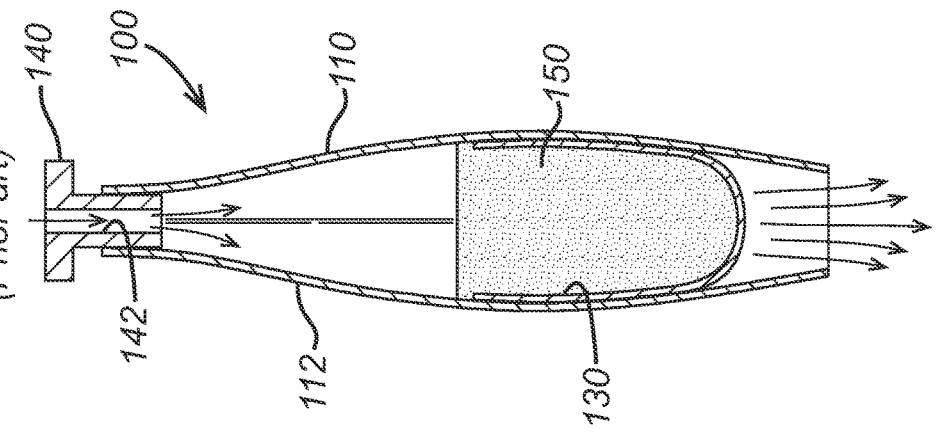
FIGS. 1, 2a and 2b show a FLAVIA® type capsule according to the prior art as hereinbefore described.
Figure 2A:
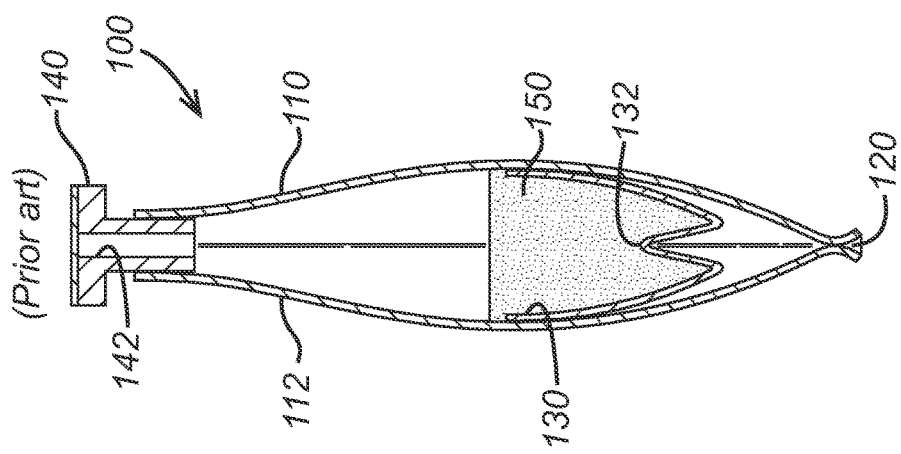
Figure 1:
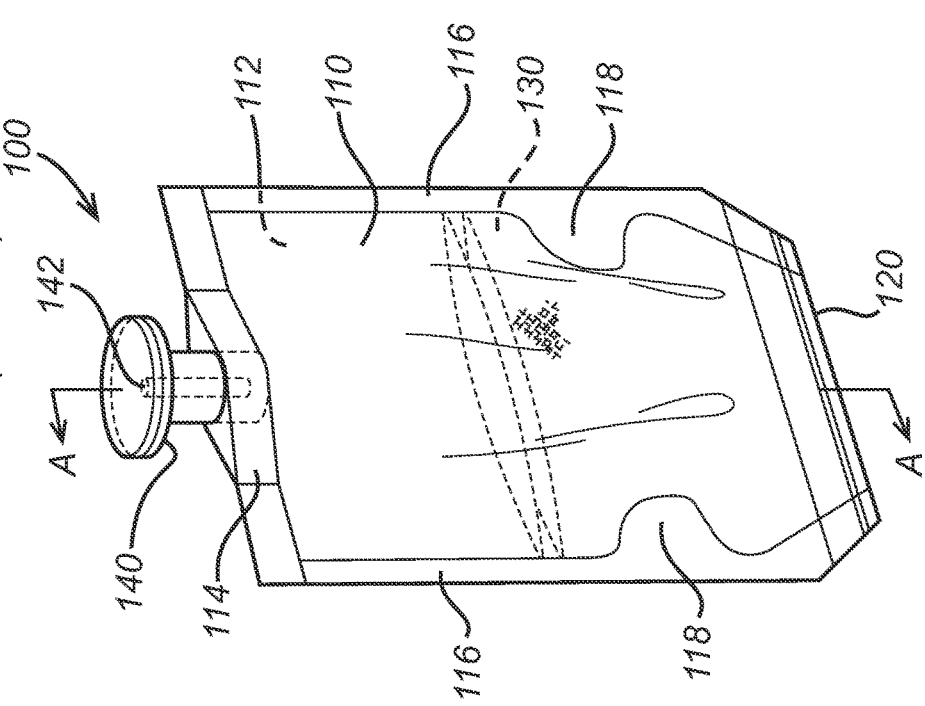

In a first aspect, the present invention provides a beverage preparation capsule containing a beverage preparation ingredient, the beverage capsule comprising: front and back sheets of substantially air- and liquid-impermeable flexible film materials, the sheets being bonded together in face to face relation along a top edge, first and second side edges, and a bottom edge, wherein a region of the bonding in the bottom edge is releasable by heat and/or pressure to allow escape of beverage from the capsule during beverage preparation; the front and back sheets further being bonded together in face to face relation by a transverse seal extending intermediate the top and bottom edges, the transverse seal being interrupted by a gap, whereby the gap provides fluid communication between a beverage ingredient chamber located above the gap and a beverage outlet chamber located below the gap, wherein said outlet chamber is in fluid communication with said releasable region of bonding in the bottom edge; and a V-folded filter strip having first and second edges bonded to internal surfaces of the first and second back sheets respectively, said edges extending transversely across said capsule within or proximate to the intermediate transverse seal, whereby the V-folded filter strip extends across the gap to provide a filter element in the gap The term "capsule" as used herein refers to a suitably sealed container containing beverage preparation material, typically particulate material such as ground coffee. The ingredient is sealed inside the capsule before use. That is to say, at least the beverage ingredient chamber of the capsule is sealed in substantially air- and moisture impermeable fashion. The capsule is suitably formed from materials that are substantially impermeable to oxygen and moisture in order to preserve the freshness of the beverage ingredient. Preferably, the capsule is substantially shelf stable. That is to say, it may be stored at ambient temperature and atmospheric conditions for a period of at least 3 months, preferably at least one year, without significant deterioration of the contents.

The front and back sheets of the capsule define the capsule body. The term "body" is used herein in its usual sense of a three-dimensional shape including an enclosure for retaining the beverage brewing ingredient. It will be appreciated that the capsule body may be of any suitable shape in plan view, including circular, square, other regular polygons, or trapezoidal. Suitably, the capsule body is substantially rectangular in plan view. Suitable dimensions are: height about 5 cm to about 12 cm, width about 3 cm to about 8 cm. In these embodiments the width of the filter strip is total from about 30 mm to about 50 mm, for example about 40 mm (i.e. about 20 mm on each side of the fold).

The terms "top" and "bottom" herein, and related expressions such as "above" and "below", and "front" and "back" are relative expressions intended to clarify the relative positions of elements of the capsules and apparatus, with reference to the accompanying drawings. While the "top" end of the capsules may indeed be uppermost in use, it will readily be appreciated by the skilled person that this may not necessarily be the case, depending on the orientation of the beverage preparation machine. In any event, the "top" or "upper" regions of the capsule are those that are upstream, and "bottom" or "lower" elements are downstream with respect to the flow of liquid during beverage preparation. For example, it is possible that the beverage preparation machine is orientated such that the water flows through the capsule in a horizontal direction during beverage preparation. In this way the top end of the capsule and the bottom end of the capsule would be at the same vertical height. It will be appreciated from the description and drawings of the present invention herein, however, that the beverage preparation machine is preferably orientated such that the water flows through the capsule in a substantially vertical direction during beverage preparation.

The front and back flexible sheets are bonded together to define an ingredient chamber in which the beverage preparation ingredient is stored, and in which the beverage is prepared by infusion or dissolution of the beverage preparation ingredient. The ingredient chamber is suitably substantially filled by the ingredient, for example at least about 50% of the volume of the chamber is filled by the ingredient. The uncompressed volume of the chamber is suitably from about 5 ml to about 100 ml.

The gap in the intermediate transverse seal defines an outlet channel extending from the beverage ingredient chamber, through which the beverage escapes from the chamber during beverage preparation. The outlet channel is substantially free of beverage ingredient. The outlet channel has a length in the direction of flow of the beverage, and a cross-section perpendicular to that flow. The length of the outlet channel is suitably from about 1 mm to about 20 mm, for example about 5 mm to about 10 mm. The width of the outlet channel is suitably from about 5 mm to about 50 mm, suitably from about 10 mm to about 30 mm, for example about 15 mm. The uncompressed mean cross-section area of the outlet channel is substantially less than that of the beverage ingredient chamber, for example the mean uncompressed cross-sectional area of the outlet channel is suitably no more than about 10% of the mean uncompressed cross-sectional area of the beverage ingredient chamber. Furthermore, as will be explained further below, the outlet channel is normally compressed (pinched) during beverage preparation to further reduce its cross-section. In embodiments, the mean width of the outlet channel is suitably from about 5 mm to about 30 mm, for example about 10 mm to about 20 mm, and the mean uncompressed depth of the outlet channel is less than about 4 mm, for example from about 0.4 mm to about 2 mm.

The V-filter strip is a simple folded strip of filter material, suitably a nonwoven textile material, for example a nonwoven web of polypropylene fibers. The total width of the strip (measured from the first longitudinal edge to the opposite longitudinal edge, perpendicular to the V-fold) is suitably from about 30 mm to about 50 mm, for example about 35 mm to about 45 mm. The V-fold is suitably located on the median line of the strip. The strip is suitably of substantially the same length as the width as the capsule, whereby it is bonded transversely into the capsule across substantially the whole width of the capsule, suitably with the short end edges of the strip embedded in the side edge seals of the capsule. The strip has two longitudinal edges remote from the V-fold. Each of these edges is bonded to the front and back sidewalls of the capsules, respectively, transversely to the axis of the capsule, such that the V-fold is located below the side edges. It is a feature of this invention that the side edges of the V-strip are bonded to the side walls within or proximate to the intermediate transverse seal, whereby the edges of the V-strip do not extend above the transverse seal to any appreciable extent. That is to say, the edges do not project above the top of the transverse seal (and therefore above the top of the outlet channel) by more than about 10 mm, preferably not by more than about 5 mm, more preferably they do not so extend at all. This feature helps to ensure that the ingredient bed is fully and evenly wetted and extracted by the flow of liquid through the ingredient chamber. The present inventors have found that the prior art capsules of FIGS. 3 and 4 that have the V-strip filter bonded to the side walls well above the transverse intermediate seal allow liquid to escape sideways through the filter above the outlet channel and to flow downwards intermediate the filter and the side wall of the ingredient chamber without fully extracting the ingredient. The present invention overcomes this problem.

The filter strip is bonded to the front and back sheets in the intermediate transverse seal by heat or ultrasonic bonding, simultaneous with forming the intermediate transverse seal. Accordingly, the filter strip suitably contains thermoplastic fibers to assist such bonding.

The basis of operation of the capsules according to the invention is that the beverage is prepared by injection of water into the beverage ingredient chamber where the beverage is formed, and the beverage is filtered as it escapes from the ingredient chamber through the outlet channel. The beverage cannot escape from the body without passing through the filter. The filtration material generates a back pressure across the outlet channel, whereby high brewing pressures can be maintained inside the ingredient chamber (e.g. for brewing espresso coffee) without excessively fast escape of beverage. This back pressure can be regulated or fixed by applying a pinch to the outlet channel to compress the filtration material, thereby varying the liquid escape cross-section through the outlet channel. The filtration material is sufficiently compressible, and preferably resilient, to enable control of the liquid escape cross-section by compressing the filtration material.

The sheet or flexible film material used to form the body of the capsule will usually be a laminate comprising two or more of the following layers: a thermoplastic sealant layer for bonding the sheet to other members of the package; a substantially gas-impermeable barrier layer, which suitably is a metal film such as aluminium film; adhesion layers to improve adhesion between other layers of the laminate; structural layers, for example to provide puncture resistance; and/or a printing substrate layer. The structural layers could be made of polyolefins, polyester, nylons, or other polymers as is well known in the art. In certain embodiments, the front and back of the capsule comprise flexible sheets. In certain embodiments, the front and back faces could be formed from a single sheet of material folded over along one edge. In certain embodiments, at least a region of at least one of the front and back sheets may be transparent to allow the user to see the ingredient.

The front and back sheets and/or the filter and/or the injection nozzle may comprise or consist essentially of a compostable material. The term "compostable" signifies that the material is substantially broken down within a few months, suitably within a few weeks, when it is composted. Typically, the capsule is at least about 90% composted within six months, as determined by the method of ISO14855, as in EN13432. Thermoplastic compostable polymers that could be used for the capsule include polymers and copolymers of lactic acid and glycolic acid, polyhydroxybutyrates, polyvinyl alcohols (PVOH), ethylene vinyl alcohols (EVOH), starch derivatives, cellulose and cellulose derivatives, and mixtures thereof.

Suitable materials and methods of manufacture are described, for example, in the already-cited patent specifications relating to the FLAVIA capsule system, for example GB-A-2121762, GB-A-2122881, EP-A-0179641, EP-A-0247841 and WO-A-9905044.

The capsule further comprises a downstream (outlet) chamber located in fluid communication with the downstream end of the outlet channel opposite the beverage ingredient chamber. Suitably, the beverage ingredient chamber, the outlet channel, and the downstream chamber are all formed by bonding together the front and back faces of sheet material with a suitable pattern (profile) of bonding. The downstream chamber is suitably considerably smaller than the beverage ingredient chamber, for example no more than about 25% of the volume of the beverage ingredient chamber. The outlet channel and the downstream chamber (where present) are suitably located at an end of the capsule opposite to the locus of liquid injection, e.g. the injection nozzle of the capsule. In embodiments, the capsule is suitably substantially axially symmetric (i.e. has two-fold rotation/reflection symmetry about a longitudinal axis), and suitably the injection nozzle (where present), the outlet channel, and the downstream chamber (where present) lie on the longitudinal axis.

The downstream chamber being wider than the outlet channel and in fluid communication with the releasable bottom seal on the capsule assists opening of this seal when the downstream chamber fills with hot beverage from the channel.

The downstream chamber may also function as a conditioning chamber for the beverage exiting the outlet, that is to say a chamber in which bubbles within the liquid can separate from the liquid to form a "crema" on espresso coffee. Alternatively or additionally the downstream chamber may comprise one or more conduits for directing the beverage to one or more beverage outlets. For example, the downstream chamber may be bifurcated to direct the beverage to two outlets located adjacent to opposite edges of the capsule. In other embodiments, the downstream chamber may be funnel-shaped to direct the beverage to a single outlet located centrally.

As already noted, the beverage outlet from the downstream chamber is sealed with a releasable seal that is opened under the influence of heat and/or pressure of beverage in the downstream chamber (optionally assisted by external heating such as hot air applied externally by the brewing apparatus). The releasable seal is substantially impermeable to air or moisture so as to preserve the freshness of the beverage brewing ingredient by preventing ingress of air or moisture through the liquid guide before brewing commences. For example, the releasable seal may comprise a layer of pressure-sensitive adhesive as described in EP-A-0179641 or WO99/05036.

In preferred embodiments, the bottom of the V-strip filter (i.e. the vertex of the V) is bonded inside the bottom edge seal of the capsule, in particular within the releasable seal portion. It has been found that embedding the bottom of the V-strip filter within the releasable seal results in more reliable opening of the pack and a more marked "pop" sound when the pack opens.

Suitably, the capsule further comprises a nozzle through which liquid can be injected into the chamber containing the beverage preparation ingredient. The nozzle is suitably a thermoplastic nozzle having a tubular bore for receiving a liquid injector tube from a beverage preparation machine. The bore may be cylindrical, or it may have a non-circular cross-section. The nozzle may have a single outlet inside the chamber, or it may have a plurality of outlets inside the chamber, for example an outlet manifold for distributing the beverage making liquid within the beverage ingredient enclosure. The nozzle outlet or outlets may be located at an edge of the capsule, or they may be located more centrally within the enclosure. Suitable nozzles are described in EP-A-0179641 and WO-A-9905036. The inlet end of the nozzle may comprise an annular seat (recess) around the bore for receiving an O-ring on the injection tube to form a pressure-tight seal between the injection tube and the nozzle.

The nozzle suitably comprises a flange at its inlet end to assist gripping of the nozzle bore by the brewer clamp. The flange may be profiled in longitudinal cross-section to define a key profile, whereby the capsule can only be inserted into the brewer clamp if the key profile of the nozzle flange fits a key way in the brewer clamp. Alternatively or additionally, the nozzle may be molded from a coloured plastic, for example a black, white, red or blue plastic, to assist capsule recognition by the user and/or by optical capsule recognition devices on the brewer. This can be used to ensure that inappropriate capsules are not accidentally inserted into the brewer.

Suitably, the nozzle is sealed by a frangible barrier to maintain freshness of the beverage preparation ingredient prior to preparation of the beverage. The frangible barrier may comprise, or consist essentially of, a thin sheet of film material that can be pierced by a liquid injector tube on a beverage making machine. In other embodiments in which the nozzle is molded from thermoplastics, the frangible barrier may be a thermoplastic barrier molded in one piece with the nozzle, and having at least a peripheral region of weakness to enable the barrier to be pierced by a liquid injector tube on a beverage making machine.

Typically, the capsule is a single-serve capsule. That is to say, the amount of ingredient contained in the capsules is sufficient for the preparation of one portion of beverage, i.e. in the case of espresso coffee from about 10 to about 250 ml, suitably from about 25 ml to about 125 ml of beverage. For example, the capsule may contain from about 2 g to about 25 g of ground coffee or from about 1 g to about 9 g of leaf tea. Suitably, the capsule is a single-use capsule that is disposed of, or recycled, after one use.

In use, as explained further below, the capsule is substantially completely enclosed by, and in contact with, the inner surfaces of the clamp cavity. The cavity supports the beverage brewing capsule enclosed within the cavity, thereby enabling high hydrostatic pressures to be developed inside the capsule without bursting the capsule. Indeed, it is envisaged that the capsule could be formed with very thin walls, thereby reducing the amount of plastic waste material that remains after brewing.

It can readily be seen that the above capsules can be manufactured using only minor modification of the methods used to make the capsules of GB-A-2121762, GB-A-2122881, EP-A-0179641, EP-A-0247841 and WO-A-9905044. In particular, the capsules can be manufactured from continuous strips of front and back sheet material and a continuous strip of V-folded filter material, using suitably profiled heat or ultrasonic sealing jaws to form the top, edge, and intermediate seals and the region of bonding below the intermediate seal that defines the outlet chamber.

In a second aspect, the invention provides a beverage preparation apparatus for preparing a beverage by injection of pressurized water into a capsule wherein the capsule has at least one flexible wall, the beverage preparation apparatus including a clamp assembly operable between an open configuration and a closed brewing configuration for beverage preparation, the clamp assembly comprising: a first clamp member having a recess in an inner wall thereof for receiving part of a capsule; a second clamp member the second clamp member comprising a rigid peripheral frame and a resilient central region formed by a resilient layer spanning the peripheral frame, wherein respective inner walls of the first and second clamp members in the closed brewing configuration define a chamber for substantially enclosing and supporting a capsule during beverage preparation, the chamber having an inlet region for injection of water and an outlet region for escape of a beverage; a piston member comprising a piston face abutting the resilient central region of the second clamp member, and a piston body resiliently coupled to the rigid peripheral frame to allow limited resilient movement of the piston member relative to the rigid peripheral frame; and a drive element acting on the piston to open and close the clamp assembly.

Suitably, the beverage preparation apparatus according to the present invention is suitable for preparing a beverage from a capsule according to the invention. The beverage preparation apparatus suitably comprises a rigid chassis of metal or similar strong material to which the moving parts are anchored, together with a housing to surround the chassis and the moving parts.

Suitably, the first and second clamp members are movable together in face-to-face fashion along a path (hereinafter "the direction of closure") to grip and enclose the capsule. Suitably, one of the first and second clamp members is fixed relative to the chassis of the beverage preparation apparatus following insertion of the capsule and prior to clamping. The fixed clamp element is suitably the first clamp member. The other clamp member is moved by a drive mechanism along a path to clamp the capsule. Suitably, at least a final part of said path is substantially linear along said direction of closure.

An inlet region of the chamber formed by the first and second clamp members is normally located at a first end of the chamber (also referred to herein as the "upper end") and the outlet region is normally located at the opposite end (also referred to herein as the "lower end"). In embodiments such as those described in detail herein, the inlet is suitably located above the outlet, for example substantially directly above the outlet. The term "longitudinal" refers to the direction from the inlet end to the outlet end. The term "transverse" or "horizontal" herein refers to a direction perpendicular to the longitudinal. The term "median line" herein refers to the transverse line located half-way between the inlet and the outlet. The term "region proximate to the inlet" refers to the region of the clamp chamber located between the median line and the inlet. The term "region proximate to the outlet" refers to the region of the clamp chamber located between the median line and the outlet.

The inner surfaces of the clamp members define a chamber for the beverage preparation capsule when the clamp assembly is in a closed position. The beverage preparation capsule is supported by and normally substantially completely enclosed by and in contact with the clamp members, thereby enabling high hydrostatic pressures to be developed inside the capsule without bursting the capsule. Indeed, it is envisaged that the capsule could be formed with very thin walls, thereby reducing the amount of plastic waste material that remains after use. The substantial enclosure formed by the first clamp member and the second clamp member in the closed brewing configuration will have an inlet opening to allow liquid to be injected into the capsule that will be held within the chamber and it also has an outlet for allowing the brewed beverage to leave the chamber. Apart from this inlet and outlet, the first clamp member and the second clamp member form an enclosed chamber when in the closed brewing configuration.

The first clamp member suitably encloses and supports one of the front or back faces of the capsule in use. Suitably, an internal surface of the clamp member is profiled to fit around said front or back face of the capsule, e.g. said internal surface is concave. The first clamp member is pivotally connected to the chassis of the beverage preparation apparatus. In a preferred embodiment, the first clamp member is mounted vertically (i.e. the first clamp member has its inlet at the upper end and its outlet at the lower end), and the first clamp member is located outwardly from the second clamp member within the apparatus. In a preferred embodiment, the first clamp member is able to pivot about one edge relative to the chassis, preferably the lower (outlet end) edge for insertion of a capsule into the first clamp member. In this way the first clamp member functions as a door that can be opened for insertion of a capsule and closed when the apparatus is in operation or at rest.

The first clamp member may be locked into its closed brewing configuration by a securing mechanism. Each of the clamp members may be independently placed in their closed brewing configuration. It is only when both clamping members are placed in their closed brewing configurations that the clamping chamber between the two members is established.

The securing mechanism of the first clamp member can be unlocked to allow the first clamp member to be accessed, such as to insert a capsule for beverage preparation. The securing mechanism can secure the first clamp member to the chassis of the apparatus. Accordingly the securing mechanism comprises complementary securing components on part of the first clamping member and the second part on the chassis. In this way, the first clamp member is resistant to being displaced from its closed brewing configuration when a force is applied to it during the brewing process. The securing mechanism may be a latch. The latch may have a spring loaded arm pivotally connected to the first clamp member and a complementary protrusion extending from the chassis which the spring loaded arm slides over when the first clamp member is moved to its closed brewing configuration, the arm resiliently hooking around the protrusion when the first clamp member reaches its closed brewing configuration. In this way the first clamp member can be easily moved from its open configuration to its closed brewing configuration but cannot return without the spring loaded arm being moved pivotally out of engagement with the chassis protrusion.

In these embodiments where the first clamp member can be pivoted for capsule insertion, the first clamp member may be biased with a spring or equivalent means so that it pivots to the open position when the locking mechanism is unlatched. Alternatively, a motor may be operatively associated with the first clamp member to pivot the first clamp member between open and closed positions. The first clamp member may made of metal or similar rigid material, and it may be lined with a layer of resilient material.

The first clamp member may comprise a removable cover that forms the inner wall of the first clamp member. The removable cover may be held in position by an interference fit, latches or an arrangement of magnets. The presence of a removable cover enables easy cleaning of the capsule-facing surface of the first clamp member by removing the removable cover from the apparatus.

The second clamp member comprises a resilient layer (made from any suitable material, such as an elastomeric material) supported on a rigid frame having a central void. The resilient layer has a front surface for contacting and enclosing the beverage capsule, and a back surface. The resilient layer extends across the void in the central region of the rigid frame. The resilient layer is such that it may elastically deform under application of a force (in particular a force applied by the piston as described below). The rigid frame is not deformable in the beverage preparation apparatus under the forces experienced during the operation thereof.

The piston extends inside the void of the rigid frame and has a piston face that abuts against the back of the resilient layer, whereby displacement of the piston towards the rigid frame in the closure direction of the second clamp member (as defined above) causes the piston face to press against the back of the resilient layer and to displace the resilient layer into the beverage preparation cavity of the clamp. In this way the clamp assembly can tamp, i.e. compress, the capsule in the clamp chamber. This also supports the contents of the capsule during injection of liquid enabling the attainment of high brewing pressures.

The piston is coupled to the rigid frame by resilient means, such as a spring. A plurality of springs may be spaced around the periphery of the piston and the rigid frame to act as the resilient means. The presence of resilient means permits resilient displacement of the piston for a limited distance towards or away from the rigid frame about a central (zero displacement) position. The central position is the rest position of the piston relative to the rigid frame when no force is acting to impart a relative movement between the two components. In the central position, the piston face is located just abutting, or a short distance such as 0-10 mm, behind the back of the resilient layer. The resilient means permit the piston to be displaced for a limited distance, for example 5-15 mm towards the rigid frame to displace the resilient layer forward from the frame in the direction of closure of the second clamp member. In this manner the piston can move beyond the central position, while the rigid frame maintains contact with the first clamp member, ensuring the capsule in the clamp chamber remains substantially enclosed and allowing the capsule to remain gripped between the rigid frame and the first clamp member even though the piston is moving. Once a maximum displacement of the piston in the frame has been reached in this direction, the piston may abut in non-resilient fashion against the frame so that any further displacement of the piston would require displacement of the frame, which is resisted by the locking of the first clamp member to the chassis when the clamp assembly is in the closed brewing configuration.

As described hereinabove, the resilient coupling between the rigid frame and the piston allows the movement of the piston to move the rigid frame into contact with the first clamp member and then ensure uniform contact all around the periphery of the first clamp member. The movement of the piston may continue relative to the rigid frame so as to tamp the contents of the capsule present between the two clamp members. In this way, the resilient means increases the tolerances to which the clamp assembly is manufactured and/or operated, since the resilient means allows compensation if one part of the rigid frame contacts the first clamp member before the rest of the rigid frame, and ensures uniform contact between the first and second clamp members.

As described hereinabove, the resilient means may be in the form of springs. The springs may be present around bolts that extend between the rigid frame and the piston. The bolts can extend from one of the piston or the rigid frame and be received in the other component (i.e. the rigid frame or piston, as appropriate) so as to ensure the piston remains aligned with the void in the centre of the rigid frame and that the springs remain in place between the piston and the rigid frame.

The rigid frame is suitably made of metal or rigid plastic. It suitably has dimensions similar to the outer dimensions of the beverage preparation chamber of the capsule to be brewed, whereby the edges of the beverage preparation chamber are tightly gripped between the rigid frame (including any resilient layer over the frame) and opposed edges of the first clamp member during beverage preparation to provide a pressure-tight seal around the beverage preparation chamber.

The resilient layer is suitably of similar size to the rigid frame and is suitably provided with a peripheral flange, whereby it is fitted over the front face of the rigid frame with the flange forming an interference fit or snap fit around the outer periphery of the rigid frame to retain the resilient layer on the frame. This allows the resilient layer to be replaced easily when it becomes worn.

The resilient material of the resilient layer is conformable but suitably substantially incompressible, for example it may be a solid layer of elastomer. Typically, the layer of elastomer is from 5 to 25 mm thick and has Shore hardness of from 10 to 60 Shore, preferably from 20 to 50 Shore. The resilience of the front surface of the resilient layer may differ in different regions of the layer so as to allow the shape of the cavity to change in response to pressure during brewing. The front surface may also be profiled with pressure pads to improve liquid flow through the capsule during brewing, as described further below.

It has been found that improved beverage preparation can be achieved when the inner surface of one or more of the clamp members comprises one or more pressure pads that protrude into the chamber formed by the clamp assembly when in a closed position. The pressure pads assure uniform compression of the beverage ingredient bed inside the capsule. The pressure pads may be configured or profiled to optimize the flow of liquid through the beverage ingredient bed. Suitably, the pressure pads are provided on the front surface of the resilient layer.

When the clamp assembly is in a closed brewing configuration and enclosing the beverage preparation capsule in the chamber, the one or more pressure pads squeeze an upper part of the enclosed capsule prior to injection of water into the beverage preparation capsule. This in turn helps to hold and compress the bed of beverage preparation material (such as coffee) within the capsule, which allows the beverage preparation medium (typically water) to flow uniformly through the bed, thus minimising channelling of liquid through the beverage preparation material during brewing and improving extraction of the beverage preparation material into the beverage preparation medium.

The resilient layer may deform and adjust to compensate for the irregular form of beverage preparation capsules and/or different amounts of ingredient inside the capsules, and may also compensate for variations in pressure during fluid injection thus regulating the hydrostatic pressure within the capsule. This results in a more uniform exposure of the compressed bed of beverage preparation material to the liquid medium (typically water) which improves diffusion. This provides a beverage of increased quality whilst simultaneously reducing waste of beverage preparation material due to channelling.

Furthermore, this deformability allows the pressure pads to adapt to beverage preparation capsules containing different amounts of ingredients, improving the versatility of the clamp assembly.

Suitably, in the above embodiments, a concave base front surface of the elastomeric layer of the second clamp element is profiled to conform generally to the shape of the capsule. This enables the inner surface of the clamp to conform to the outer surface of the beverage preparation capsule and thereby prevent the capsule from bursting when pressurized liquid is injected into the capsule. The accurate conformity of the clamp surface to the outer surface of the capsule in use also assists beverage brewing quality by reducing the channelling of liquid through the bed of beverage brewing ingredient, since it promotes uniform compression of the beverage brewing ingredient.

The pressure pads projecting from the inner surface of the clamp member may be configured to compress the beverage ingredient and to minimise the volume of air or liquid in the beverage preparation capsule during brewing. This advantageously minimises the volume of liquid in the capsule thus assisting in the preparation of more concentrated beverages, such as espresso, by maximising exposure of liquid to the bed and providing a more efficient process of beverage preparation.

The pressure pad(s) protruding from the inner surface of the resilient layer of the second clamp member into the chamber formed by the clamp members in a closed brewing configuration may be of any suitable configuration to achieve the desired object of squeezing out the head space of the capsule and compressing the coffee bed inside the capsule. Typically, one or more of said pressure pads are of a substantially arcuate transverse and/or longitudinal cross section in the absence of an external force. The pressure pads suitably have a rounded (biconvex), cushion-like shape. The arcuate pressure pads suitably intersect said concave base surface at a contact angle of from about 2° to about 45°, for example from about 10° to about 30°. The arcuate pressure pads suitably have a maximum height (measured from the tangent to the underlying curve of the base surface) of from about 1 mm to about 15 mm, for example from about 4 mm to about 10 mm.

The pressure pads are suitably located principally proximate to the inlet region of the clamp enclosure. That is to say, more than half of the pressure pad volume is located in the upper half of the clamp chamber. This positioning achieves the objective of squeezing out head space from the capsule and compressing the ingredient bed into the bottom of the capsule. This positioning also allows the profile of the pressure pads to guide the flow of water into the ingredient bed.

While squeezing the upper part of the capsule, it remains necessary for the pressure pads to allow passage of liquid to the ingredient bed in the lower part of the capsule. For this reason the pressure pad(s) are suitably profiled in transverse cross-section to define one or more longitudinal channels of lesser height. The liquid can flow through the capsule underneath these channels. Suitably, at least one of the channels is located substantially centrally so as to direct flow centrally onto the ingredient bed. For example, the pressure pad(s) may have a generally m-shaped transverse cross-section.

The one or more pressure pads are preferably elongate in shape and extend generally in a direction from the inlet region towards the outlet region. The or each pressure pad may independently extend from about 20% to about 80% of the length of the chamber, for example, from about 30% to about 75% of the length of the chamber. In other words, while the pressure pad(s) are located primarily proximate to the inlet region, they may extend beyond the median line of the cavity towards the outlet region.

In some embodiments, only one pressure pad is present in the clamp assembly. In other embodiments, a clamp member comprising pressure pads may comprise more than one pressure pad. In some embodiments, from 1 to 10 pressure pads may be present. In a preferred embodiment, from 1 to 4 pressure pads may be present, for example, a clamp member may comprise three pressure pads.

Suitably, the pressure pads consist of three pillow-like (biconvex) elongate pads extending from the inlet towards the outlet on the resilient layer of the second clamp member. The pads suitably overlap transversely so as to present a corrugated inner surface. Suitably, the outer pads are of higher profile than the central elongate pad. Suitably, the pads do not extend all the way to the outlet, thereby leaving a space in the outlet region of the clamp cavity into which the beverage ingredient is compressed.

As previously noted, the water pressure inside the clamp can exert forces of 5000 N or more on the clamp members during brewing. This force must be safely contained. Moreover, this force acting on the clamp drive mechanism of the apparatus may force the drive mechanism out of the correct alignment. Therefore, the beverage brewing apparatus of the present invention is suitably configured so that this level of force is not transferred in such a way that it causes damage to the drive mechanism.

A preferred method to achieve this is to utilise a, so-called, top-dead-centre (TDC) arrangement in order to geometrically lock the second clamp member into position. In this approach, the drive mechanism comprises a crankshaft and a crank arm, such that the crankshaft rotates about a crankshaft centre and is connected to a first end of the crank arm at a first pivot point, so that crank arm can pivot relative to the crankshaft. The second end of the crank arm, opposite the first end, is connected to the piston at a second pivot point. This allows the crank arm to pivot relative to the piston. The piston's movement is constrained to move towards and away from the first clamp member, typically in a linear manner. Thus, as the crankshaft is driven in rotation by a motor, the piston face is either moved towards or away from the first clamp member. At the top-dead-centre arrangement, the piston face is at its furthest possible position from the crankshaft centre and the crankshaft centre, first pivot point and the second pivot point are aligned, such that the first pivot point is positioned between the crankshaft centre and the second pivot point. Also, any force exerted on the crank arm and crank shaft from the second clamp member, via the piston, is in the direction of alignment of the pivot points. In this position, any force exerted on the piston face does not result in rotation of the crankshaft and so eliminates the risk of back-driving the motor and thereby protects it from potential damage. Thus, in the top-dead-centre position, the movable parts (piston and crankshaft) are geometrically locked such that the second clamp member is held in position against the high brewing forces that occur in the clamp chamber.

There is an acceptable degree of tolerance associated with the top-dead-centre arrangement since the motor can provide some resistance to back-driving forces without being damaged. In the present invention, the top-dead-centre arrangement remains effective provided that the crankshaft centre, the first pivot point and the second pivot point are substantially aligned and substantially in the top-dead-centre arrangement. In this context, the term "substantially" means that the crankshaft may be at an angle which is no more than ±5°, preferably no more than ±2.4° away from the top-dead-centre arrangement.

The top-dead-centre arrangement described hereinabove means that the second clamp member is locked in position without the need for complex additional components, such as the locking mechanism shown in FIGS. 7 and 8.

As an alternative to locking the second clamp position into position via a top-dead-centre arrangement (or possibly even additionally thereto), the apparatus of present invention may comprise a locking mechanism which locks the first clamp member and the second clamp member in the closed brewing configuration. One such locking mechanism is shown in FIGS. 7 and 8. The locking mechanism may allow limited deformation of the second clamp member's resilient layer in the closed brewing configuration to achieve compaction (tamping) of the capsule before brewing, and/or dewatering of the capsule after brewing. Suitably, the locking mechanism engages the first clamp member and the piston, but does not directly engage the rigid frame or the resilient layer. Instead, in the closed brewing configuration the rigid frame of the second clamp member is forced against the first clamp member to seal the capsule enclosure, forming the clamp chamber, by resilient force transmitted from the piston to the rigid frame by the resilient coupling between the piston and the rigid frame. The resilient coupling and the locking mechanism allow further limited movement of the piston towards the resilient frame at the closed brewing configuration, for example to assist unlatching of the locking mechanism and/or to push the resilient layer further into the brewing cavity to compact the beverage ingredient inside the capsule and/or to dewater the capsule after beverage preparation. Finally, the apparatus is suitably configured to uncouple the drive mechanism from the piston while brewing is taking place so that the whole of the force exerted by the brewing pressure inside the clamp chamber is taken by the locking mechanism and not by the drive mechanism.

Suitably, the locking mechanism comprises: at least one first locking pin projecting from a side of the first clamp member; at least one second locking pin projecting from a side of the piston; and a movable locking gate having a first flange for abutment against the first locking pin in the closed and locked position (which is also referred to herein as the locking mechanism's closed brewing configuration), and a second flange for abutment against the second locking pin in the closed and locked position, wherein the locking gate is movable when the clamp assembly is in the closed brewing configuration from an open position at which the flanges do not engage the pins to a locked position in which the flanges engage opposite sides of the first and second pins, respectively, to prevent the first and second pins from moving apart while allowing the first and second pins to move towards each other.

Suitably, the pins on the first clamp member and on the piston are located opposite each other on a line substantially parallel to the direction of closure of the clamp members. Suitably, respective first and second locking pins and locking gates are located on opposite sides of the first clamp member and the piston. Suitably, two, three or more pairs of locking pins are provided at spaced locations on respective sides of the first clamp member and the piston, with corresponding gate bars and locking flanges to provide locking on both sides at multiple spaced locations.

The locking gate suitably comprises a vertical drive shaft and one or more transverse locking bars attached to the drive shaft and having the respective flanges at opposite ends of each locking bar. "Transverse" here means in the direction of closure of the clamp members. The locking gate is suitably linked to the chassis of the apparatus and is moved perpendicular to the direction of closure of the clamp halves by a suitable drive mechanism.

One or both of the clamp members may include a heater to heat the beverage ingredient inside the capsule before and/or during beverage preparation. The heater may, for example, comprise an electric heater element inside or on the surface of one or both of the clamp members. In other embodiments, one or both of the clamp members may be heated by circulation of hot water or steam through conduits inside the member. The heater suitably achieves a temperature of 90-110° C. at the surface of the heated clamp member. The heating of the beverage ingredient is desirable in order to provide a constant, optimised extraction temperature, for example about 90° C. to 95° C. for espresso coffee. In the absence of external heating the thermal energy needed to heat up the beverage ingredient can cause an initial drop in the brewing temperature below optimum values, especially for drinks that require a low-volume of hot water, such as espresso coffee.

The maximum volume of the brewing chamber when the clamp is in the closed and locked position in the absence of internal pressure is suitably from about 25 cm$^3$ to about 250 cm$^3$, more suitably from about 30 cm$^3$ to about 150 cm$^3$. The minimum volume when the piston is fully extended into the brewing chamber is suitably about 75% or less of the maximum volume, for example about 50% or less of the maximum volume.

The clamp assembly is adapted to apply a pinch force to the outlet channel from the beverage ingredient chamber of the capsule so as to achieve an optimum combination of beverage escape rate from the capsule and back pressure inside the beverage ingredient chamber to optimize beverage quality and brewing speed. For example, the clamping apparatus in an outlet region from the brewing chamber may comprise clamp elements configured to pinch the outlet channel of the capsule to provide the constriction. Various arrangements are suitable, including (a) a fixed-configuration outlet constriction, (b) an adjustable constriction, and/or (c) a biased constriction.

In the simplest arrangement, the clamp assembly in the closed position has internal surfaces in the outlet channel region that define an opening of fixed size and shape that provides the desired degree of compression to the outlet channel of the capsule. For example, one clamp member may have a flat surface in this region and the other clamp member may have a flat surface with a channel of the desired dimensions cut into the surface thereof. When the flat surfaces are brought into abutment when the clamp assembly is closed, the desired opening in the bottom of the clamp is formed by said channel. Suitably, for example for use with capsules of the kind shown in FIGS. 5 and 6, the fixed gap provided in the bottom of the clamp chamber has a depth of from about 0.1 mm to about 0.8 mm, and a width of from about 10 mm to about 20 mm, for example about 15 mm. This provides the desired pinch force on the outlet channel of the capsule. Suitably, the channel is provided in a rigid surface of the first clamp member and the flat surface is provided by the layer of elastomer over the rigid frame of the second clamp member.

In other embodiments, the size of the opening formed at the outlet region of the clamp where the pinch force is applied to the capsule can be adjusted, for example by mounting the appropriate portion of one of the clamp members on a screw. This allows the size of the opening to be optimized for different capsule sizes, ingredients and/or desired back-pressure in the capsule. Indeed, by increasing the size of the opening sufficiently, this allows the clamp to be used both for high-pressure (e.g. espresso) brewing, but also for low-pressure (e.g. filter coffee or tea) brewing. The opening is constricted for high-pressure brewing so as to maintain a high back pressure in the ingredient chamber. The opening is widened for low-pressure brewing so as to allow a satisfactory flow rate through the outlet channel while keeping the back pressure in the brewing chamber below about 1.5 bar.

In yet other embodiments, at least one of the members providing said pinch has an inner surface in said fluid exit region that is biased to apply a pinch force to a capsule in the chamber. The biasing means compensates for variations in pack shape, and also compensates for deformation of the clamp members as the capsule is pressurized by injected water. Suitably, the said inner surface in the fluid exit region may be biased by being supported on a spring as described in more detail in WO2012175985. The biasing means may be adjustable to vary the bias force.

The second clamp member may be supported by an arm fixed to the piston and extending substantially perpendicular to the direction of closure of the clamp. The end of the arm distal to the piston is attached to the chassis of the beverage preparation apparatus by a pivoting connection. This allows the arm to swing the second clamp member away from the first clamp member to open the clamp and allow disposal of the capsule into a bin inside the apparatus. The piston may be moved by a drive pin received in the slot in the back of the piston. The drive pin is suitably attached to one end of a crank arm. The other end of the crank arm may be attached by a pivoting connection to a toothed crankshaft that is driven by an electric motor having a toothed wheel engaging the toothed crankshaft with suitable gearing to provide a further mechanical advantage. The crankshaft rotates about an axle (corresponding to the crankshaft centre), which is mounted to the chassis of the beverage preparation apparatus, preferably with the crankshaft substantially in line with the central longitudinal axis of the clamp so as to provide a balanced closing force on the clamp. As already noted, the clamp drive only needs to apply enough force to close the clamp and to drive the piston inwardly to compress the beverage brewing chamber of the capsule before and after pressurized injection of water into the clamp. The whole force exerted by the pressurized liquid during brewing is taken by the locking arrangement. Therefore, the clamping mechanism itself does not need to exert very large forces.

The apparatus according to the present invention suitably further comprises an injector tube or tubes for injecting the aqueous fluid into the interior of the capsule when the capsule is held in the brewing cavity. The injector tube is suitably made of metal, and suitably has a sharpened tip to assist piercing of the freshness barrier of the capsule nozzle. The injector tube may be inserted into a nozzle on the top of the capsule as described in GB-A-2121762. Suitably, the apparatus further comprises a mechanism to move the injector into the capsule prior to the start of brewing, and out of the capsule once brewing is complete. The mechanism may be actuated by closing and opening of the first clamp member, or it may be actuated by separate, mechanical or electromechanical devices. The injector tube suitably communicates with the source of pressurized water through a check valve, such as a ball valve, that opens under pressures greater than for example about 5 bar to allow water to pass through the tube under pressure but that blocks dripping of water from the injector tube when it is not in use, e.g. due to thermal expansion of water during warm-up of the brewer. Suitably, an O-ring is mounted around the injector tube for forming a pressure-tight seal with an inlet nozzle of the capsule as described further below. The O-ring may be held in place by a flange or sleeve fixed to the injection tube above and abutting the O-ring.

The apparatus comprises a pump for supplying water to the injector tube at pressures greater than 5 bar gauge, for example at 10-15 bar gauge. A typical pump is a shuttle pump that operates at fixed displacement and fixed speed, whereby the water flow rate decreases as the back pressure increases up to a maximum pressure of typically about 16 bar. Suitably, the apparatus further comprises a heater to supply an aqueous brewing medium such as hot water or steam, suitably hot water at a temperature of suitably about 80 to about 100° C. to the pump.

The apparatus of the invention may further comprise a cup receiving station for locating a cup to receive beverage prepared in the clamp assembly, wherein said cup receiving station comprises a cup detection apparatus comprising an infrared transmitter and an infrared receiver located such that a cup positioned in the receiving station interrupts an infrared beam between said infrared transmitter and said infrared receiver to detect the presence of a cup in the cup receiving station, wherein the apparatus control and user display are programmed to perform the following steps when the cup detection apparatus does not detect a cup in the cup receiving station: (a) interrupt beverage preparation, and (b) prompt the user to perform one of the following options: either (i) insert a cup into the cup receiving station, or (ii) override the cup detection function.

The cup receiving station is normally situated directly below the bottom of the pack outlet in use, i.e. below the outlet of the clamp chamber, so that beverage drops under gravity into the cup. The cup receiving station may comprise a shelf for supporting a cup. The vertical height of the shelf may be adjustable to accommodate cups of different sizes. Alternatively, the shelf may be at a fixed vertical height below the bottom of the pack outlet but movable so that it can be displaced away from the drink vending position. This allows the shelf to be optionally used depending on the size of the cup into which the beverage will be dispensed, larger cups being able to forgo the use of the shelf and be placed on the base of the cup receiving section directly below the bottom of the pack outlet.

The infrared cup detector is well known in the art and will not be described further. The present inventors have found that a drawback of such IR cup detectors is that they can fail to detect glass cups because of the transparency of glass to infrared radiation. This can be overcome by providing the user interface with the option to override the cup detect function and continue with beverage preparation if, for example, a glass cup is being used that gives a false negative output from the IR cup detect.

The apparatus may comprise a pressure sensor to measure the pressure in the liquid inlet line to the capsule in the clamp (the back pressure). The apparatus may further comprise control elements to vary the pump output and/or the configuration of the outlet channel region of the clamp in response to the measured back pressure, for example to maintain a substantially constant back pressure during beverage preparation.

The apparatus preferably comprises a second clamp assembly for holding a second capsule, an injector for injecting water into a capsule held inside the clamp assembly; and a pump for pumping said water through said injector at a pressure less than about 1 bar gauge. The second clamp and injector may, for example, be similar to those described in the aforementioned patent specifications GB-A-2121762, GB-A-2122881, EP-A-0179641, EP-A-0247841 and WO-A-9905044. In this way a single apparatus has clamps adapted, respectively, for high-pressure and low-pressure beverage preparation. Suitably, the first and second clamp assemblies are in a single housing with a single control system and display associated therewith.

Suitably, the apparatus may comprise a control system and display programmed to prompt a user to carry out the following sequential steps:
  (a) select a beverage to be prepared;
  (b) insert a capsule into the appropriate clamp; and
  (c) wait while a beverage is prepared from the capsule;
Typically, the prompt (a) directs the user to select from various beverage options, such as filter coffee, filter tea, espresso coffee, or two-component beverages such as cappuccino coffee.

The prompt to select a beverage may be by means of one or more menu selection screens accessed by soft keys. The apparatus may also be programmed to prompt the user to provide a payment before or after said step (a). The payment may be by means of a coin-freed mechanism, or a card swipe, or some other automatic debiting procedure provided in the system.

The display may show a welcome screen, such as a logo or a picture of a cup of coffee, when not in use. The apparatus may also be programmed to prompt the user to place a receptacle in the cup receiving station of the apparatus before said step (a). As noted above, the apparatus may comprise a cup-detect interlock, for example an infrared detector interlock, to block or interrupt the operation of the apparatus if there is no receptacle in a beverage receiving position in the apparatus. The control system may be adapted to provide a prompt to the user to insert a cup (or to override the cup detection, as described above) if no cup is detected in the cup receiving station at any stage of the procedure.

The control system and display may comprise for example a liquid crystal display and soft key controls. In addition or as an alternative to visual prompts on the display screen, the prompt (b) may include mechanically opening the appropriate clamp to permit insertion of a capsule. The prompt (b) may include a visual prompt on the display to select a capsule of the type appropriate for that clamp (i.e. a high-pressure capsule according to the present invention for a high-pressure beverage such as espresso coffee, or a conventional FLAVIA capsule for a low-pressure beverage for preparation in the low-pressure clamp). In this way, the user is instructed to place the capsule in the relevant clamp, avoiding any confusion in relation to where the capsule should be placed to progress the brewing process.

A prompting function is of general applicability to beverage preparation apparatus with multiple positions into which the capsules can be placed. The process of exposing the appropriate opening, i.e. opening the appropriate brewing section door, intuitively directs the user to place the capsule in the required position for the chosen beverage.

Alternatively or additionally, the beverage making apparatus may further provide a prompt after prompt (c), to perform the following step: (d) transfer receptacle from a beverage receiving station below the second clamp assembly to a beverage receiving station below the first clamp assembly. This prompt would be appropriate, for example, if a two-component beverage is being prepared for example a cappuccino-type beverage comprising a hot foamed dairy component prepared in the second clamp assembly from a whitener/milk capsule, to which is then added a shot of espresso coffee prepared from a coffee capsule in the first clamp assembly.

Thus, in these embodiments, the beverage making apparatus may comprise a control system and display programmed to prompt a user to carry out the following sequential steps in response to a command to brew a multicomponent beverage:
  (a) insert a first capsule containing a first beverage brewing ingredient into one of the clamps;
  (b) wait while a first beverage component is brewed from the first capsule;
  (c) transfer the receptacle from the cup receiving station of the said one clamp to the cup receiving station of the other clamp
  (d) insert a second capsule containing a second beverage brewing ingredient into the holder of the other clamp; and
  (e) wait while a second beverage component is brewed from the second capsule.

The apparatus is also capable of preparing both beverage components in a single clamp, for example if the clamp assembly according to the invention has an outlet region that can be adjusted to provide a larger opening resulting in low back-pressure in the ingredient chamber for preparation of filter coffee or foamed milk components, followed by a smaller opening to provide a high back-pressure for preparation of an espresso coffee shot. In these embodiments the control system and display are programmed to prompt a user to carry out the following sequential steps in response to a command to brew a multicomponent beverage:
  (a) insert a first capsule containing a first beverage brewing ingredient into the clamp;
  (b) wait while a first beverage component is brewed from the first capsule;
  (c) insert a second capsule containing a second beverage brewing ingredient into the holder; and
  (d) wait while a second beverage component is brewed from the second capsule.

In all of the above embodiments, the beverage making apparatus may further provide a final prompt to perform the following step: remove receptacle containing the beverage from the apparatus.

When the beverage preparation apparatus comprises two clamp assemblies, it is preferable that the two clamp assemblies are configured to be powered by a single power inlet into the apparatus. This maintains simplicity for the user and minimises problems of separate power supplies drawing current simultaneously from a plurality of the user's power outlets.

When the beverage preparation apparatus comprises two clamp assemblies, it is preferable that the two clamp assemblies are configured to share one water tank. This reduces the complexity of the device and maintains a smaller form factor.

The beverage preparation apparatus suitably further comprises a mechanical ejection means for ejecting capsules from the holder after water injection is complete. Suitably, the capsules are ejected into a bin inside the apparatus.

The beverage preparation apparatus according to the invention may further comprise an air pump and associated conduits and one or more valves under the control of the apparatus control for injecting air into the capsule after beverage preparation to dewater the capsule.

Suitably, the beverage making apparatus according to any of the embodiments above further comprises a water jet-forming nozzle supplied by one of the pumps for directing a jet of water into a liquid in a receptacle in the cup receiving station of one or both clamps to foam the liquid by high-shear mixing of air and liquid when it hits the surface of a liquid in a receptacle. The internal cross sectional area of the jet-forming outlet of the nozzle is generally from about 0.2 to about 3 mm$^2$, preferably from about 0.4 to about 2 mm$^2$, for example about 1 mm$^2$. Since water is substantially incompressible and not significantly viscoelastic, it follows that a circular water jet is produced having a diameter of from about 0.5 to about 2 mm, preferably from about 0.7 to about 1.5 mm.

Details of such jet-forming nozzles and their use to produce foamed beverages are described in WO-A-02/087400, the entire content of which is incorporated herein by reference.

The jet-forming nozzle may also be used to stir the beverage at any stage of the beverage preparation procedure by applying a short duration jet to swirl the liquid in the receptacle. Thus, for example, such a jet may be used to stir the beverage as a final step in the beverage preparation procedure. This provides further beverage preparation options. For example, in the conventional cappuccino process, the foamed milk is produced in the cup as described above. This is normally done in a low-pressure brewing clamp. A shot of espresso is then deposited into the cup from the high pressure clamp as described above. This produces a cappuccino having a distinct, dark coffee layer at the bottom, and a distinct, pale and milky layer above. Some consumers prefer this distribution, especially for visual appeal in a glass cup. However, other consumers prefer a fully mixed "latte" of uniform colour. Therefore, the control system and user display of the apparatus of the present invention suitably includes an option for the user to select cappuccino or latte. If either of these selections is made, then the prompted two-pack brewing sequence is described above is followed. If latte is selected, then the process includes a further step of injecting a jet of water into the cup after deposition of the coffee shot to swirl the liquid in the cup to mix the layers uniformly.

The jet-forming nozzle may be formed from an elastomer material, such as silicone. This ensures that the jet forming-nozzle has a degree of flexibility, which assists cleaning and resists the build-up of deposits, such as limescale. The beverage preparation apparatus may be configured so that the jet-forming nozzle is periodically manipulated as part of the apparatus' regular operation. This manipulation moves the nozzle, preferably in a sudden manner, helping to dislodge any deposits that may build-up over time. A regular operation that simultaneously manipulates the jet-forming nozzle may be the removal of the bin that collects the waste capsule. The bin removal operation is not part of the beverage brewing process and so the dislodged deposit will not inadvertently be incorporated into a prepared beverage.

In a further aspect, the present invention provides a beverage preparation system comprising a beverage preparation apparatus according to the present invention, and further comprising a plurality of beverage preparation capsules, preferably according to the present invention, for use in the apparatus. Suitably, the plurality of capsules contain different beverage preparation ingredients, respectively. Where the apparatus is adapted for both high pressure and low pressure brewing, for example the embodiments described above with two clamp assemblies, suitably the capsules include different capsules specifically adapted for high pressure and low pressure brewing, respectively.

Preferably, beverage preparation in the beverage preparation apparatus and system described herein is effected by dry-opening of the capsules during preparation of the beverage. The beverage preparation capsules described herein are preferably adapted for dry-opening. As used herein, the term "dry-opening" means that the capsules are opened by air pressure rather by direct liquid pressure, i.e. that the afore-mentioned region of the bonding in the bottom edge of the capsule which is releasable to allow escape of beverage from the capsule during beverage preparation is ruptured by air pressure rather than direct liquid pressure. During beverage preparation pressurised water is injected into the capsule via an injector, and the term "dry-opening" means that when pressurised water is injected into the capsule or into the injector or into the pipework which feeds the injector with pressurised water from the water reservoir, the residual air present in the capsule and/or injector and/or said pipework is forced against the inside of the bottom edge of the capsule such that it is said residual air under the pressure of the pressurised liquid, rather than the pressurised liquid itself, which ruptures the bottom edge of the capsule before the pressurised water comes into contact therewith. The opening of the capsule by air pressure, rather than by direct liquid pressure, advantageously results in a cleaner opening of the capsule, avoiding any uncontrolled liquid spray during the opening of the capsule. The dry-opening of the present invention is associated with a distinctive popping sound.

Alternatively, the capsules may be opened by the presence of the injected liquid at the bottom edge of the capsule. In particular, the capsule opening may be caused by the heat and/or pressure of the liquid at the bottom edge.

Suitably, the system comprises both capsules according to the invention (e.g. for preparing espresso shots) and capsules not according to the invention, for low pressure beverage preparations such as filter coffee, filter tea, or hot foamed milk for subsequent addition to an espresso shot to form a cappuccino. The capsules not according to the invention are suitably made in accordance with one of the FLAVIA patents identified above. The hot foamed milk capsules suitably contain a solid or liquid milk concentrate for example as described in detail in WO-A-02/087400.

Since it is undesirable for a low pressure capsule to be used in a high pressure clamp, and vice versa, the apparatus suitably comprises means to ensure that only the right kind of capsule is used in each clamp.

For example, the beverage making apparatus may further comprise a capsule recognition device in the or each clamp assembly operatively associated with the control system and the display of the apparatus. At its simplest, this device may be a simple bimodal detector, such as a source of UV light and a light detector, for detecting whether a fluorescent region is present on a capsule. More complex capsule recognition devices such as bar code readers or RFID chip detectors are also contemplated. Alternatively or additionally, the capsules may be identified by the use of differently coloured plastics for the capsule nozzles. For example, the capsules for high pressure brewing may contain nozzles formed from a black plastic, whereas the capsules for low pressure brewing may contain nozzles formed from white or translucent plastic. In these embodiments the apparatus clamps further comprise a light source and light detector for detecting the colour of the capsule nozzle, and the control is programmed to interrupt the beverage preparation process if the wrong type of capsule is inserted in a clamp.

The primary purpose of the capsule recognition device is to determine whether the right type of capsule has been inserted into the clamp, i.e. a high-pressure capsule of the kind described in accordance with the present invention for a high pressure brewing clamp, or a low pressure capsule such as the conventional FLAVIA type capsules for a low pressure configuration clamp. If the recognition device determines that the wrong type of capsule has been inserted, then the control system is programmed to prompt the user to change the capsule. The recognition device may read further information from the capsule relating to the capsule ingredients and the control system then adapts the brew cycle parameters such time/temperature/water volume to optimize the product for that ingredient.

Alternatively or additionally, the first clamp may incorporate a first key way and said second clamp comprises a second key way different from said first key way, and wherein a first capsule comprises a first nozzle configuration that permits insertion of the first capsule into the first clamp through the first clamp key way but not into the second clamp through the second clamp key way element, and the second capsule comprises a second nozzle configuration that permits insertion of the second capsule into the second clamp through the second clamp key way element but not into the first clamp through the first key way.

In a further aspect, the present invention provides a method of making a beverage comprising inserting a beverage preparation capsule according to the invention into the clamp assembly of a beverage preparation apparatus according to the present invention such that the outlet channel of said capsule is pinched between the clamp members in said outlet region; injecting an aqueous liquid into said capsule in said inlet region to produce a beverage in said capsule; and allowing said beverage to escape through the outlet channel and downstream chamber.

The bottom of the capsule extends through the bottom of the clamp, whereby the beverage exiting the capsule does not contact the clamp. This substantially eliminates cross-contamination between successive beverages prepared in the same clamp.

The pressure pads extending along the inner wall of the chamber enclosing the capsule contact and compress the beverage preparation capsule when the clamp is closed around the capsule. The compressed bed of coffee (or other ingredient) inside the capsule is profiled by the buffer pads and this has been found to improve the quality of the final beverage, in particular the total extracted solids. This improvement is thought to be due to a reduction in channelling of liquid through the profiled ingredient bed inside the capsule. A further advantage of the pressure pads is that they allow the same clamp to be used for capsules containing different amounts of ingredient. Typically, systems of this type use capsules having identical dimensions but containing different amounts of ground coffee to make products of different volumes or strengths. The buffer pads enable the clamp effectively to compress capsules containing a range of different ingredient amounts.

The capsule may be preheated by a heater within the clamp assembly before and during beverage preparation. A hollow needle is inserted through the inlet region in the top of the clamp assembly and into the nozzle bore of the capsule to pierce the membrane seal, and hot water is injected at a pressure of approximately 10 bar gauge to brew coffee inside the capsule. It has been found that the pressure increase inside the capsule caused by the injection of water results in an increase in air pressure in the bottom of the capsule causing the bottom seal of the capsule to rapidly rupture allowing the opening of the capsule outlet in a dry manner, before the liquid reaches the bottom of the capsule. This has the advantage of a cleaner opening action compared to a process where the liquid is directly responsible for the capsule outlet opening action.

When a pinch is applied to the outlet channel of the capsule as discussed above, the pinch force is just sufficient to permit the resulting beverage to escape through the outlet channel at the desired rate while maintaining high pressure inside the capsule, without excessive build-up of back pressure in the ingredient chamber.

Suitably, the aqueous fluid is injected at a pressure of from about 5 to about 15 bar gauge, for example about 10 bar gauge. Typically, the aqueous fluid is injected at a temperature of from about 88° C. to about 98° C., for example about 90° C. The liquid may be injected into the capsule at an average rate suitably from about 25 ml/min to about 500 ml/min and more preferably from about 50 to about 150 ml/min. The duration of the water injection is suitably from about 10 to about 30 seconds, for example about 12 to about 15 seconds. Suitably, the aqueous fluid consists essentially of water and the brewing ingredient comprises ground coffee. This enables espresso-type coffee to be produced.

The liquid may be injected in intermittent or pulsed fashion to optimise the organoleptic properties of the product. The method may further comprise the step of injecting air into the capsule after brewing to expel residual beverage from the capsule. Alternatively or additionally, dewatering of the residue may be achieved by compressing the ingredient bed after brewing by moving the elastomeric clamp wall inwardly as described above. A similar compression of the ingredient (e.g. ground coffee) bed is suitably performed before water injection to consolidate the ingredient bed. Experiments have shown that there is an optimum degree of compression of the ingredient bed that gives maximum formation of espresso crema and other espresso-like characteristics in the coffee.

Suitably, substantially all steps of the method other than the selection of beverage type, insertion of the cup into the cup station(s), and insertion of the capsule(s) into the clamp(s) are performed automatically by the apparatus.

The specific embodiments of the present invention shown in the drawings will now be described in more detail.

Figure 3:
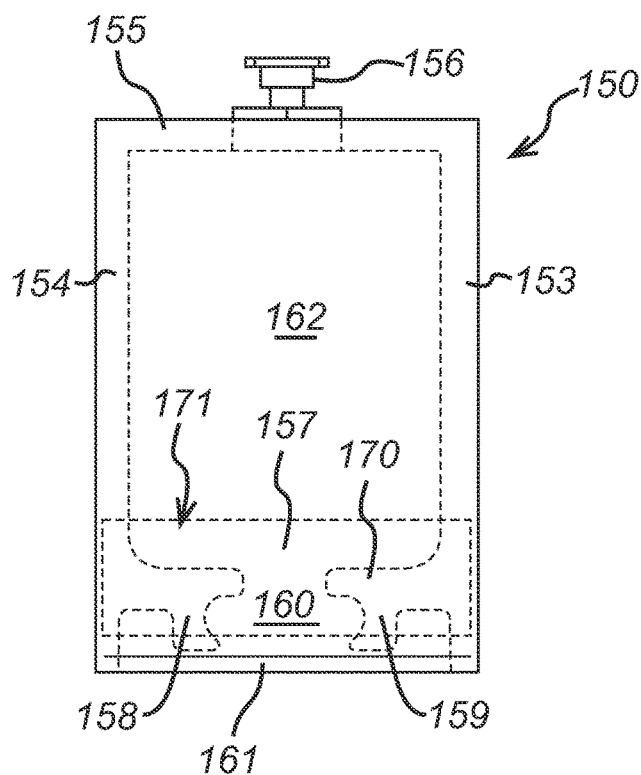
FIG. 3 shows a plan view of a prior art beverage preparation capsule as described in WO2012175985.
Figure 4:
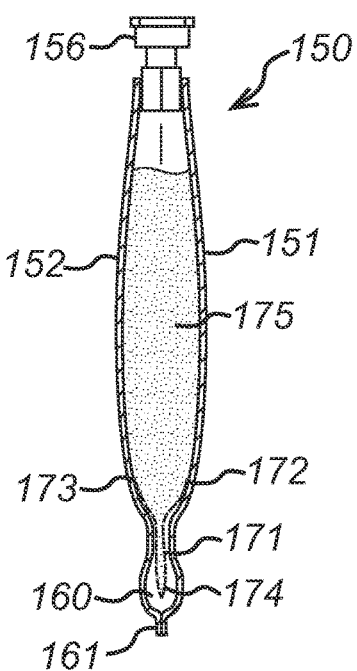
FIG. 4 shows a longitudinal cross-sectional view of the prior art beverage preparation capsule of FIG. 3.
Figure 5:
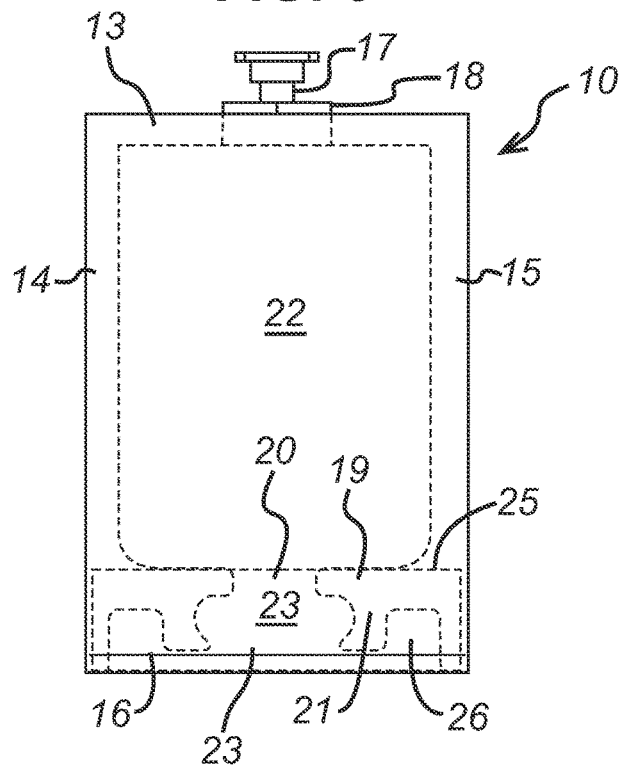
FIG. 5 shows a plan view of a beverage preparation capsule according to the present invention.
Figure 6:
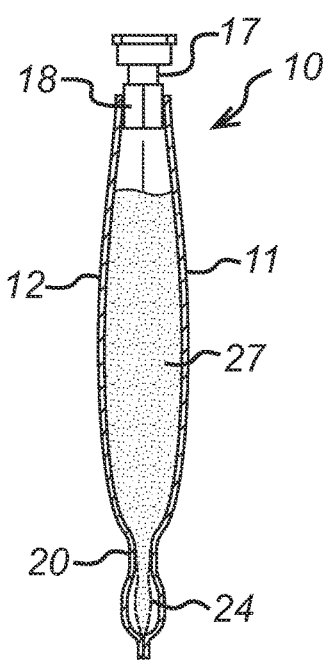
FIG. 6 shows a longitudinal cross-sectional view of the beverage preparation capsule of FIG. 5.

Referring to FIGS. 5 and 6, the capsule 10 according to the present invention is a modification of the capsule described in WO2012175985 and shown in FIGS. 3 and 4. It comprises two flexible laminate sheets 11,12. Each laminate sheet comprises an inner thermoplastic sealing film, an oxygen-impermeable metal foil layer, and an outer printing layer. The front and back sheets 11,12 are bonded together along edge seams 14,15, top seam 13 and bottom seam 16.

The bonding of the top and side edges is suitably by heat or ultrasonic bonding, to form a permanent weld between the sheets. At least a central region 23 of the bottom seam 16 is bonded with a pressure-sensitive, peelable adhesive that can be released by the action of heat and/or pressure of liquid and/or air inside the capsule, and/or assisted by heat applied from outside the capsule. A nozzle 17 is inserted into the top seam 13 of the capsule. The nozzle 34 has a central cylindrical bore and a flange at the inlet (upper) end. The outlet (lower) end 18 of the nozzle is lozenge-shaped in transverse cross-section to assist insertion into the top edge seam 13 with airtight bonding to the front and back sheets. The cylindrical bore of the nozzle is sealed at the top by frangible membrane.

A further transverse permanently bonded seam 19 between the front and back sheets extends across the capsule intermediate the top and bottom transverse seals to divide the capsule into a beverage ingredient chamber 22 and a downstream beverage collection/conditioning chamber 23. The intermediate seam 19 does not extend completely across the capsule. An unbonded gap 20 is left in the intermediate seam to provide the outlet channel from the beverage preparation chamber.

Substantially filling the ingredient chamber 22 of the capsule there is about 15 g of ground roasted coffee 27. The capsule provides an oxygen and moisture-impermeable enclosure for the coffee until the capsule is used.

The permanent transverse intermediate heat seal 19 further comprises curved downward extensions 21 on either side of the longitudinal axis of the capsule below the outlet channel 20 defining the lateral edges of the downstream (outlet) chamber 23. The width of the downstream chamber 23 is intermediate the width of the beverage ingredient chamber 22 and the narrower outlet channel 20.

A filtration material in the outlet channel is provided by a single, V-folded rectangular strip 24 of nonwoven polypropylene fiber filter material that is bonded across the width of the capsule. The long side edges of the V-folded strip are bonded into the transverse intermediate seal 19, i.e. the filter strip does not extend above the intermediate seal 19. The V-folded filter strip 24 extends downwardly through the outlet channel 20 and the outlet chamber 23, with the vertex of the V bonded into the bottom edge seal 16 of the capsule, including the heat-releasable region 23. The outlet channel 20 is thereby filled by a double thickness of filter sheet material. It is noted that in regions where the V-folded filter sheet overlaps the intermediate transverse seal, the side edge seals, and the bottom edge seal 16, the said seal between the front and back sheets is formed through the V-folded filter sheet so that the front and back sheets and the V-folded filter sheet are all bonded together. This is facilitated in the permanently heat sealed regions by the use of a filter sheet containing or consisting of thermoplastic fibers, such as polypropylene fibers.

Figure 7:
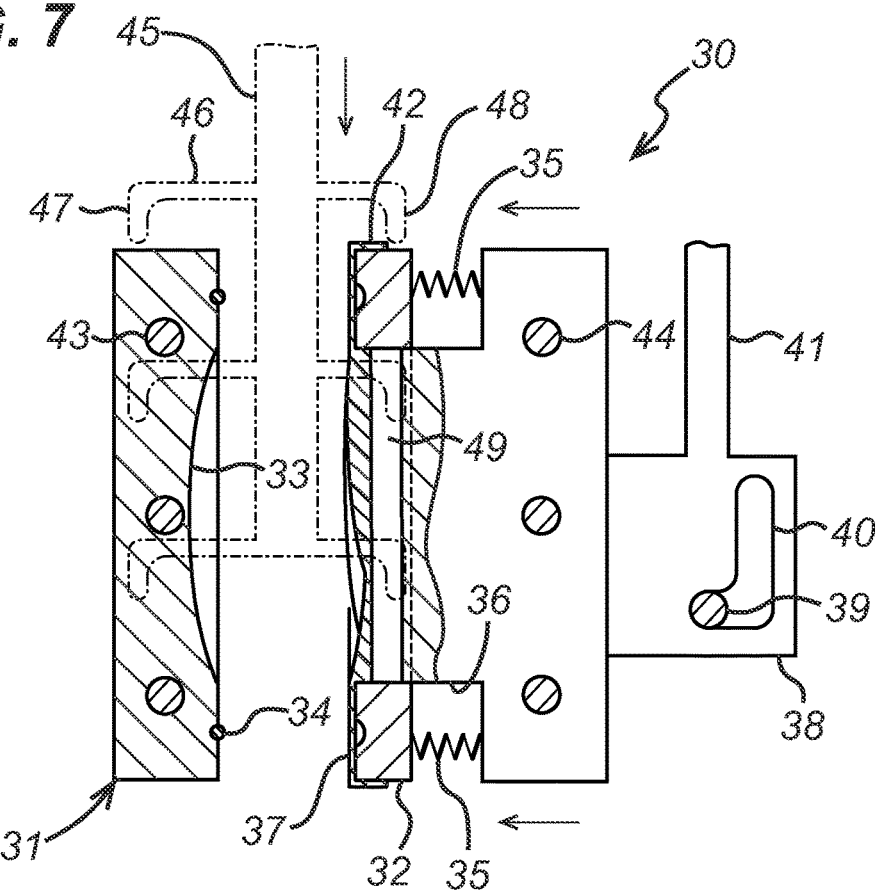
FIG. 7 shows a schematic side elevation view of a clamp assembly comprising a locking mechanism of a beverage preparation apparatus according to the present invention in an open configuration.
Figure 8:
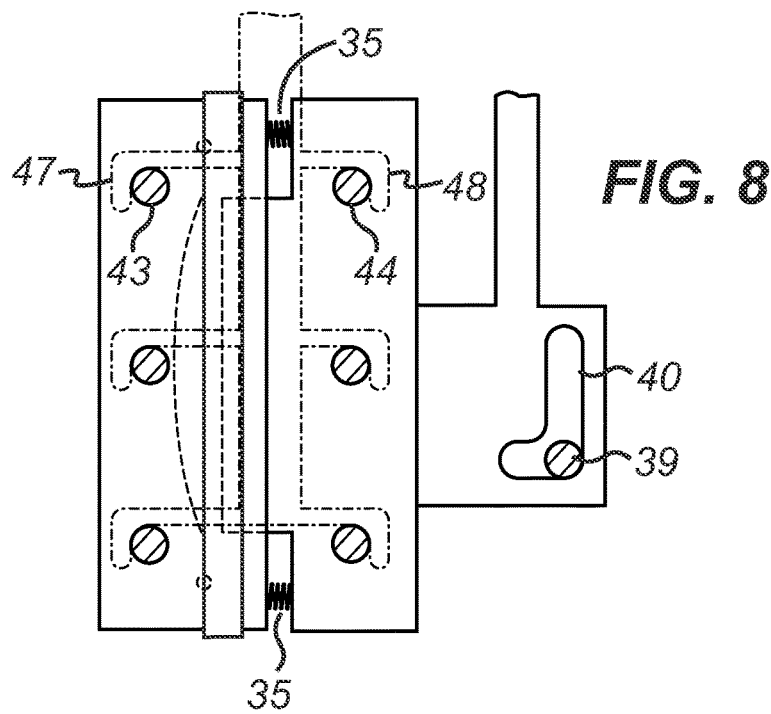
FIG. 8 shows a schematic side elevation view of the clamp assembly comprising a locking mechanism of a beverage preparation of FIG. 7 in a closed and locked brewing configuration.

Referring to FIGS. 7 and 8, a clamp arrangement 30 of an apparatus according to the present invention is shown schematically. The clamp comprises a first clamp member 31 and a second clamp member. The first clamp member 31 is formed from metal or similar rigid material with an inside surface comprising a planar periphery and a concave central region 33, which is optionally removable, for receiving the beverage ingredient chamber of a capsule, such as those according to FIG. 5 or 6. An O-ring 34 is seated in a groove extending around the planar periphery.

The second clamp member comprises a rigid frame 32. The rigid frame 32 of metal or similar surrounds a central void. A layer of elastomer 37 having a flanged periphery 42 is interference-fitted over the rigid frame 32. The surface of the layer of elastomer facing the first clamp member is profiled to define a recess having pillow pads therein as shown in more detail in FIG. 14. The opposite side of the layer of elastomer faces a piston face 49 of a piston 36, whereby displacement of the piston face 49 relative to the rigid frame 32 towards the first clamp member 31 pushes the layer of elastomer outwardly so that it bulges in the direction of the first clamp member 31.

The piston 36 comprises a piston shaft received in mating engagement in the central void of the rigid frame 32, and a piston flange extending peripherally from the piston shaft behind the rigid frame 32, i.e. the side of the rigid frame 32 facing away from the first clamp member 31. A circumferentially spaced plurality of springs 35 extends between the rigid frame 32 and the piston flange to allow limited resilient relative movement of the piston member and the rigid frame 32.

Three locking pins 43 may extend from each side of the first clamp member, and three locking pins 44 may extend from each side of the piston flange. Respective pairs of locking pins on the first clamp member and on the piston flange are aligned along the direction of closure of the first and second clamp members. A locking device shown in dash-dot lines in FIGS. 7 and 8 is provided in the form of locking rods 45 on each side of the clamp assembly, each locking rod 45 having three transverse locking bars 46, and each said locking bar 46 having flanges 47,48 at the ends thereof for engaging behind the respective pins 43,44 on the first clamp member and the piston flange as shown in FIG. 8 to lock the clamp in the closed position. An actuating mechanism (not shown) moves the locking rods 45 vertically (i.e. perpendicular to the clamp direction) to lock and unlock the clamp. It can be seen that, in the locked position shown in FIG. 8, the locking mechanism allows the piston 36 to move towards the first clamp member 31 slightly, but prevents the first clamp member and the piston from moving apart. The slight permitted additional movement of the piston towards the first clamp member can be used for: (a) easy latching and unlatching of the locking mechanism, (b) compressing (tamping) of the beverage ingredient inside the clamp prior to brewing, and (c) compressing of the beverage ingredient after brewing to dewater the capsule after brewing.

It can further be seen that, in the locked position shown in FIG. 8, the springs 35 bias the rigid frame 32 towards the first clamp member 31 to apply a sealing force around the periphery of the first clamp member where it engages with the rigid frame 32 of the second clamp member.

The back of the piston 36 comprises a centrally located rear extension 38 having a slot 40 in which is received a drive pin 39 of the drive mechanism. A support arm 41 extends from the rear extension 38 to support the piston 36 in pivoting fashion as described in more detail in relation to FIGS. 15a to 15m. The drive pin 39 is actuated by the mechanism to drive the piston 36 towards the first clamp member 31, which is fixed to the chassis of the brewer. In use, the drive pin 39 and drive mechanism initially drive the second clamp member forward until the peripheral region of the elastomer cover on the rigid frame 32 abuts against the peripheral region of the first clamp member 31. Further forward movement of the drive pin 39 compresses the springs 35 and drives the piston face 49 forward relative to the rigid frame 32. The piston 36 is driven forward beyond the position shown in FIG. 8 to force the piston face 49 into the back of the elastomer layer 37 and thereby cause the elastomer layer 37 to bulge into the beverage brewing cavity to compress the beverage ingredient inside the capsule. The locking gates 45 are then dropped and the drive pin is moved back so that the locking pins 43,44 abut against the flanges 47,48 of the locking gates 45 to lock the clamp. The drive pin 39 is then moved further back, along the slot 40 as shown in FIG. 8, so that it disengages from the piston 36 when brewing takes place inside the clamp chamber to ensure that forces arising from pressure inside the clamp chamber during brewing are not transmitted to the drive mechanism, where they could cause deformation and future misalignment. Once beverage preparation from the capsule is complete, the drive pin 39 is moved forward again to drive the piston 36 beyond the position shown in FIG. 8 to force the piston face 49 into the back of the elastomer layer 37 and thereby cause the elastomer layer to bulge into the beverage brewing cavity to compress the beverage ingredient inside the capsule to squeeze and dewater the capsule. This also disengages the locking pins 43,44 from the locking gate flanges 47,48. The locking gates 45 are then raised, and the drive pin 39 is moved back to move the second clamp member as described further in relation to FIGS. 15a-15m.

FIG. 9 depicts details of a preferred drive mechanism that can be used with the clamp assembly, and preferably as an alternative to the locking mechanism of FIGS. 7 and 8. FIG. 9 shows the clamp assembly arrangement in an open configuration. All features that are equivalent to those described in relation to the clamp assembly arrangement of FIGS. 7 and 8 have the same reference numbers.

In the embodiment of FIG. 9, the drive mechanism has a crankshaft 84 connected to the chassis of the brewing apparatus at a pivot point, the crankshaft centre 86. Accordingly, the crankshaft 84 can rotate about the crankshaft centre 86.

The crankshaft 84 is pivotingly connected to one end of a crank arm 88 at pivot point 90, allowing rotation of the crank arm relative to the crankshaft about this point. The crank arm 88 is then in turn pivotingly connected to the piston 36 at a further pivot point 92. Accordingly, the crank arm 88 can also rotate relative to the piston 36 about the pivot point 92. These two pivot points 90, 92 on the crank arm 88 are positioned at opposite ends of the crank arm 88.

The piston 36 is constrained in its movement along a direction toward the first clamp member 31. In this arrangement, rotation of the crankshaft 84 can therefore be used to control the linear distance of the piston 36 from the crankshaft centre 86, which is positionally fixed relative to the chassis. Since, the position of the first clamp member 31 is also fixed relative to the chassis prior to brewing, rotation of the crankshaft 84 also moves the second clamp member in relation to the first clamp member 31. When the pivot points are all aligned as depicted in FIG. 10, the piston 36 is at its furthest point from the crankshaft centre 86 and at its closest point to the first clamp member 31. The apparatus is therefore set up so that this arrangement of the drive mechanism corresponds to the clamp assembly being in the closed brewing configuration. The advantage of such an approach is the elimination of any resulting torque on the crankshaft 84, even when the piston experiences the significant linear force from the second clamp member associated with the back pressure from the brewing process. Hence, this arrangement of the drive mechanism effectively mechanically locks the clamp assembly in the closed brewing configuration ensuring the motor that drives the rotation of the crankshaft (not shown) is not subjected to forces that could damage it.

The beverage preparation apparatus may have a finger guard, such as illustrated in FIGS. 11 and 12, which blocks access to the clamp chamber when the clamp assembly is open but allows the exit of liquid from the clamp chamber when the clamp assembly is in the closed brewing configuration. Specifically, the finger guard may block the outlet of the clamp assembly. In the illustrated example, the finger guard 94 is pivotingly attached to the chassis of the brewing apparatus and is spring loaded to a blocking configuration, resting against ledge 96 of the chassis. When the finger guard 94 is in the blocking configuration, it is not possible for the user to access the clamping assembly from outside the chassis. This ensures that the user does not inadvertently place any item or appendage between the first clamp member 31 and the second clamp member during the clamping process, avoiding the risk of injury to the user or damage to the clamp.

The finger guard 94 is moved to an non-blocking configuration, illustrated in FIG. 12, as part of the action of the clamping assembly moving to the closed brewing configuration. This can be achieved by a projection 98 on piston 36 moving towards finger guard 94 as the piston 36 is moved to the closed brewing configuration. As the second clamp member contacts the first clamp member 31, the projection 98 contacts the finger guard 94 and thus moves it to its non-blocking configuration against the action of the finger guard's spring. When the clamp assembly is subsequently placed back in its open configuration by moving the second clamp member away from the first clamp member 31, the finger guard 94 will automatically return to its blocking configuration under the action of the spring.

Projection 98 is positioned to the side of the outlet from the clamp chamber so that its presence does not impede the liquid exiting from the clamp chamber. Two projections may be present, one either side of the clamp chamber's outlet to provide a balanced force to the finger guard 94 during the opening action.

Figure 13:
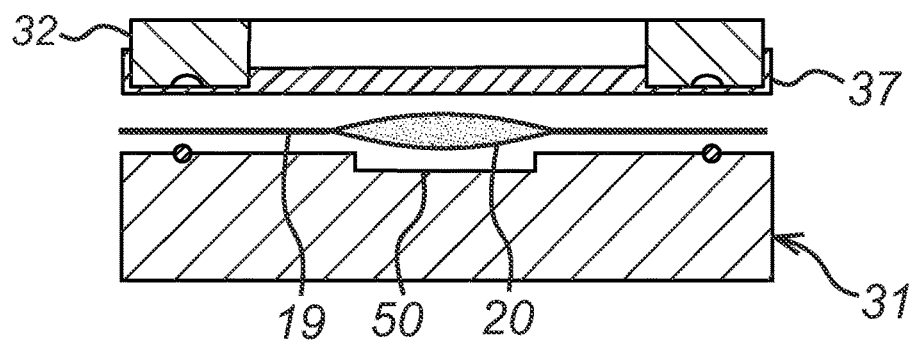
FIG. 13 shows a schematic transverse cross-section through the outlet channel region of a capsule of FIG. 5 when inserted in the clamp assembly of the present invention.

FIG. 13 shows a schematic transverse cross-section through part of the clamp assembly 30 at the location of the capsule outlet channel 20 in use. It can be seen that the transverse sealed region 19 and the outlet channel 20 of the capsule are pinched between the first clamp member 31 and the elastomeric layer 37 covering the rigid frame 32 of the second clamp member. A shallow recess 50 is present in the first clamp member in the region of the outlet channel 20, whereby the pinch is just sufficient to maintain the desired back pressure inside the capsule ingredient chamber during beverage preparation while allowing sufficiently rapid flow of the beverage through the outlet channel.

Figure 14:
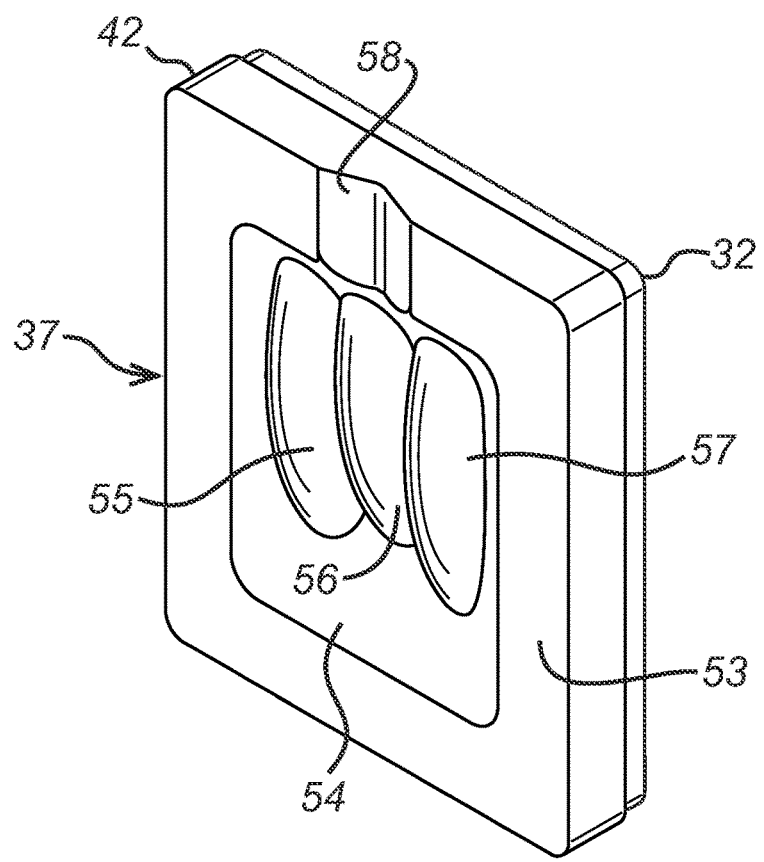
FIG. 14 shows a front perspective view of part of a second clamp member of a beverage preparation apparatus according to the present invention.

FIG. 14 shows a front perspective view of the rigid frame 32 and elastomer cover 37 of the second clamp member. The rigid frame 32 is substantially rectangular, and dimensioned to fit around the beverage ingredient chamber of the capsule. The elastomer cover 37 is molded in one piece from a silicone elastomer. It comprises a peripheral flange 42 that fits tightly around the rigid frame 32 to secure the cover on the frame while permitting easy removal for replacement when necessary. The front (capsule facing) face of the elastomer cover 37 comprises a generally planar periphery 53 for abutment against the periphery of the first clamp member 31. In use, the periphery of the capsule is pinched between this periphery 53 of the elastomer cover 37 and the periphery of the first clamp member 31. A bottom region of the elastomer cover 37 periphery pinches the outlet channel 20 of the capsule 10. A top region of the elastomer cover periphery includes a shallow V-shaped recess 58 to receive the portion of the top edge of the capsule 10 having the rhomboidal nozzle body inserted therein.

The central region 54 of the front face of the elastomeric cover 37 is generally concave to receive one side of the capsule 10. However, three pillow-shaped projections 55,56, 57 extend upwardly from the concave surface to provide improved compaction of the beverage ingredient, in particular ground coffee, inside the capsule and to improve liquid flow through the ingredient bed during brewing, as described herein.

Figure 15A:
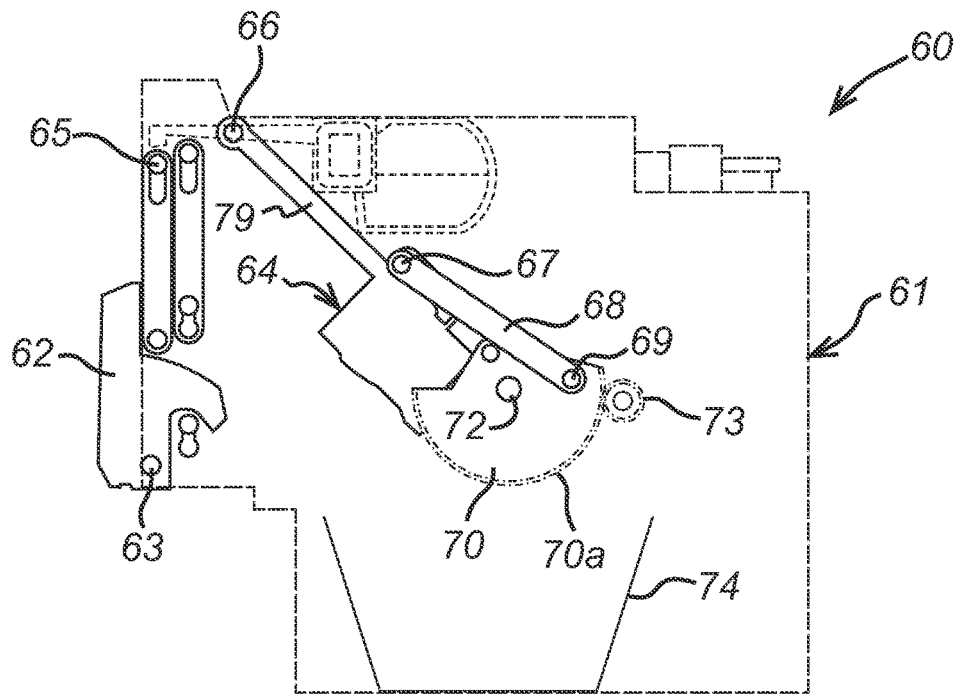
Figure 15B:
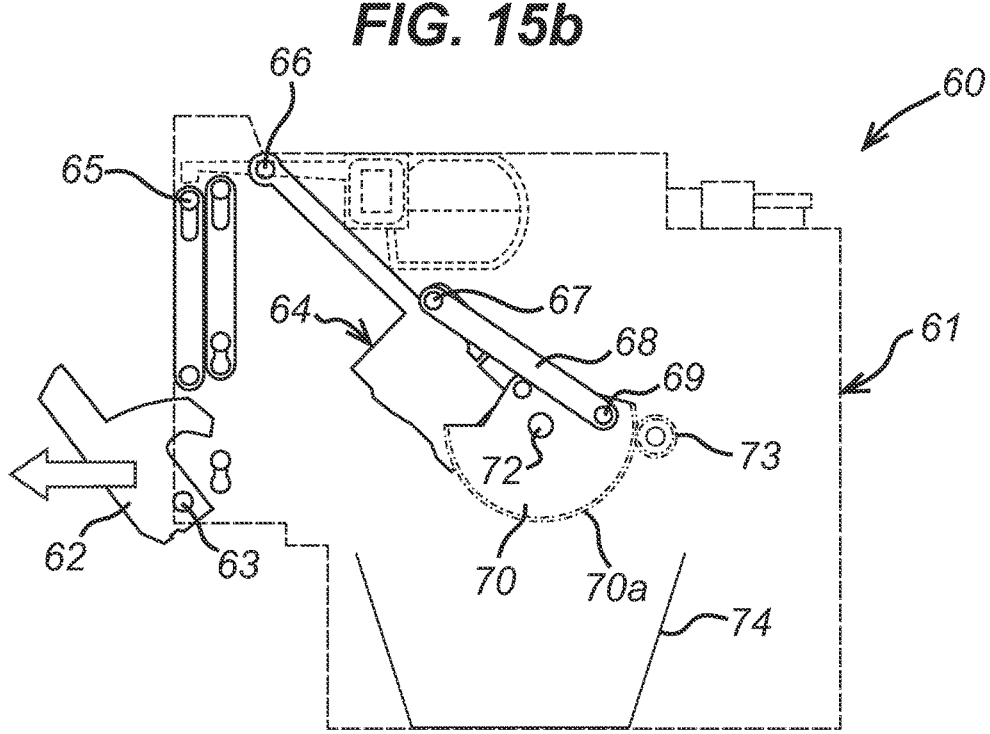
Figure 15C:
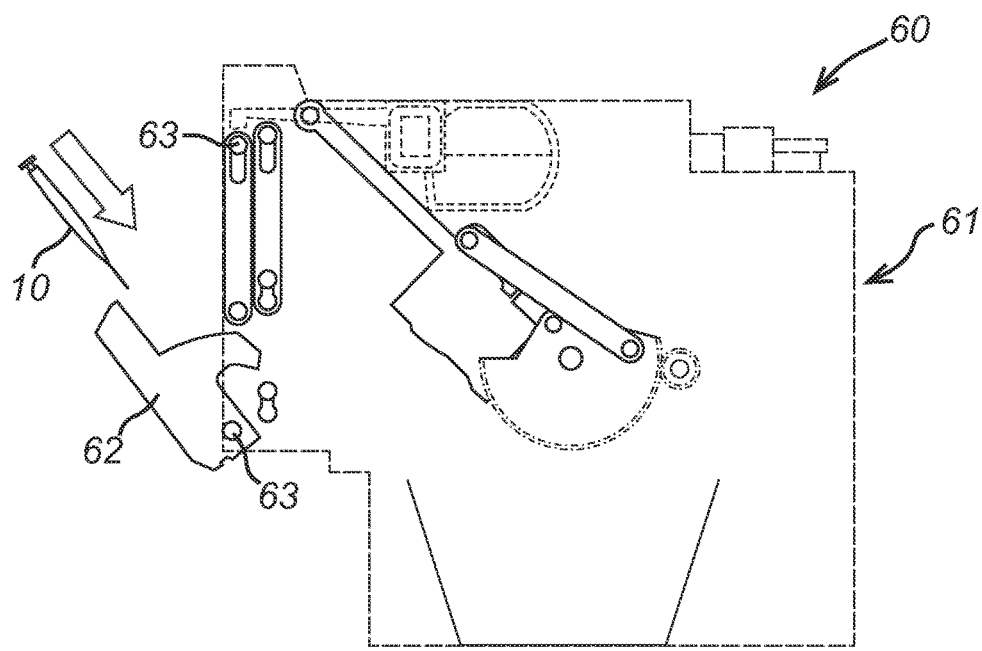

Referring to FIGS. 15*a* to 15*m*, certain mechanisms of a beverage making apparatus 60 according to the present invention are shown schematically. The apparatus 60 comprises a rigid chassis 61 having metal side plates between which most of the components of the apparatus are arranged. The first (front) clamp member is mounted on a door 62 that is attached to the chassis by a pivot 63 near the bottom of the door that allows the door to swing open as shown in FIG. 15*b* when a locking mechanism 65 is disengaged. This pivoting motion may be actuated by a motor. Closing of the door 62 by the same motor may be actuated by the user pushing the door 62 slightly towards the closed position after insertion of the capsule has been performed as shown in FIG. 15*c*. Once the door 62 is closed, the door lock mechanism 65 is engaged automatically as indicated in FIG. 15*d* to secure the top of the door to the chassis 61 so that the door and the first clamp member do not move relative to the chassis 61 during beverage preparation.

The apparatus of FIG. 15 further comprises a second clamp member 64 as hereinbefore described. The second clamp member and piston arrangement 64 is mounted on a rigid swing arm 79 having a proximal end rigidly attached to the piston, and a distal end pivotally attached to the chassis 61 through an axle 66 extending across the chassis above the position of the second clamp member when in the closed brewing configuration. The piston, as hereinbefore described, has a rear extension having a slot therein projecting from the back of the piston shaft. A drive pin 67 for driving the piston is inserted through the slot such that it can move freely in the slot. The drive pin 67 is pivotingly attached to a proximal end of a crank arm 68. The distal end of the crank arm is attached to a crankshaft 70 by a pivot 69. The crankshaft 70 is mounted on an axle 72 rotatably mounted on the chassis 61. The circular peripheral part 70*a* of the crankshaft is toothed, for engagement with a toothed drive wheel 73 of an electric motor also fixedly mounted to the chassis 61.

Figure 15D:
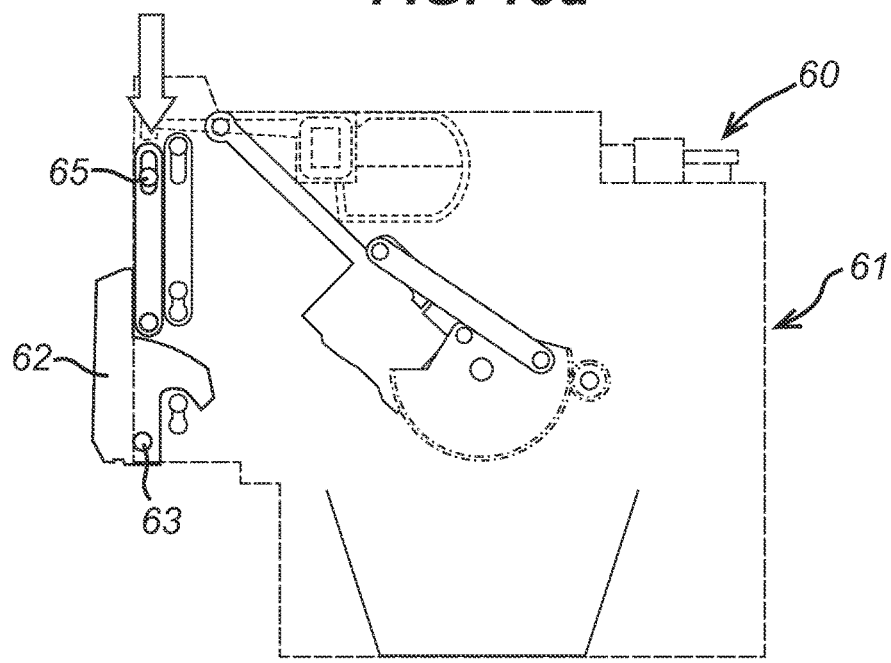
Figure 15G:
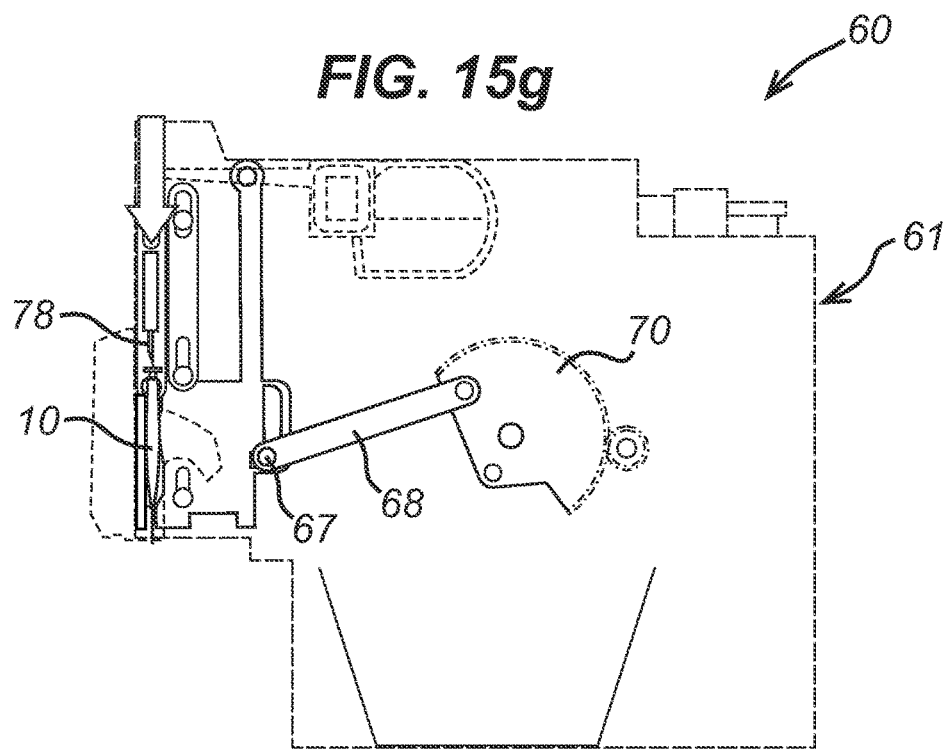

After loading of the capsule into the machine, and locking of the door and front clamp member as shown in FIG. 15*d*, the motor is actuated to rotate the crankshaft 70 to the maximum extent, whereby the crank arm 68 and drive pin 67 drive the piston and second clamp member arrangement 64 to close the clamp assembly as shown in FIG. 15*e*. The rigid frame covered with the elastomeric layer is brought into abutment with the first clamp member, and the piston is then driven 1-15 mm beyond the closed brewing configuration of the piston in order to compact the ingredient inside the capsule by forcing the elastomeric layer of the second clamp member into the brewing cavity, as described above. The gate mechanism 76 is then actuated as shown in FIG. 15*f* to drop the gates (not shown) as described in relation to FIGS. 7 and 8 above. The electric motor is then briefly actuated in the reverse direction to return the crankshaft 70 and the crank arm 68 to the position shown in FIG. 15*g*. This brings the locking pins on the clamp members into abutment with the gate flanges as described above, whereby the first clamp member, second clamp member and piston are locked in the closed brewing configuration. Also, as seen in FIGS. 8 and 15*g*, the drive pin 67 is retracted slightly in the slot on the back of the piston. This ensures that no load is applied to the drive pin 67 during beverage preparation inside the clamp chamber. The clamp assembly is now ready for preparation of the beverage inside the capsule.

Figure 15H:
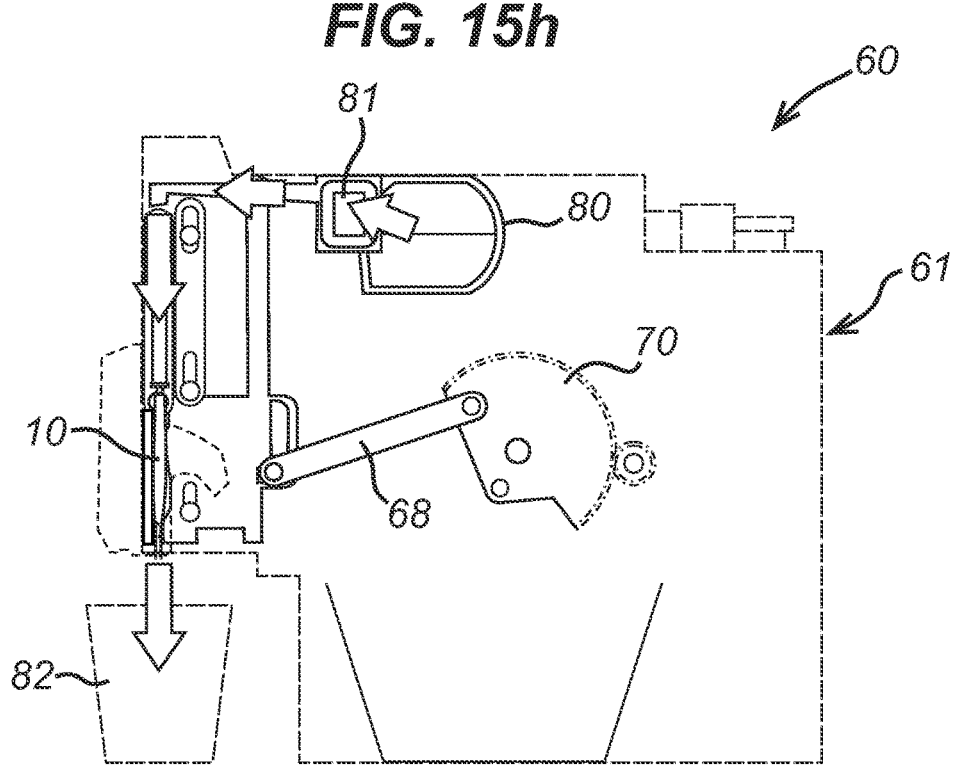

The apparatus further comprises a water injection tube 78 as shown in FIG. 15g. Following locking of the clamp, an actuator mechanism moves the water injection tube 78 downwardly to pierce the freshness seal of the capsule nozzle and form a mating seal within the capsule nozzle. Water is then pumped into the capsule 10 from a tank 80 by a shuttle pump 81 at about 10 bar pressure, as shown in FIG. 15h, to prepare the beverage inside the capsule. The beverage flows out from the bottom of the capsule 10 into a cup 82 located in a cup receiving station of the apparatus below the clamp.

Figure 15I:
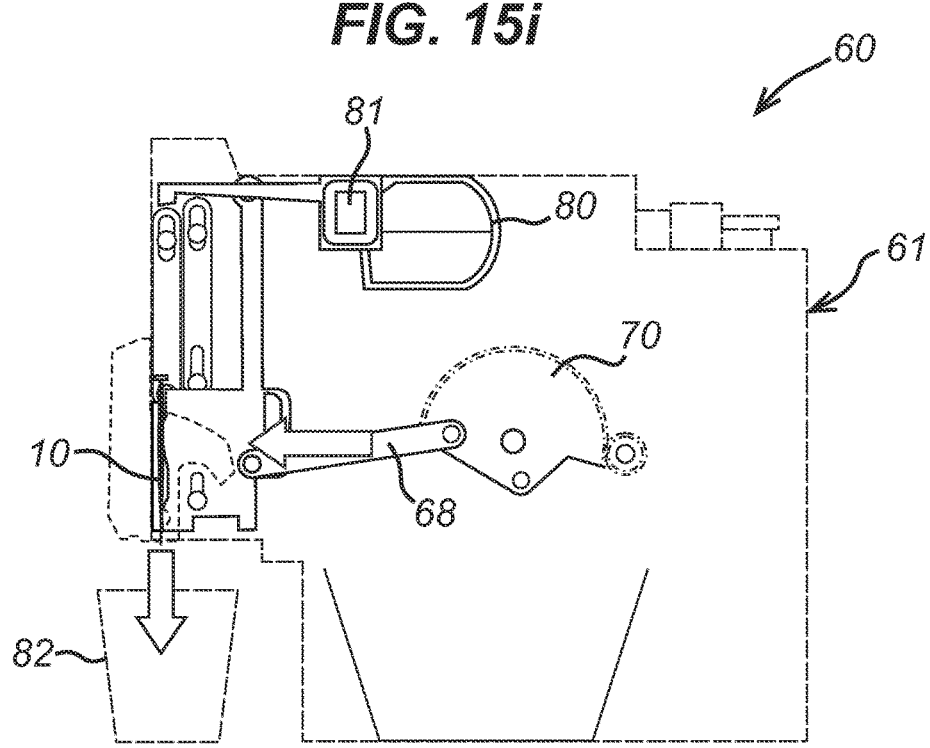
Figure 15J:
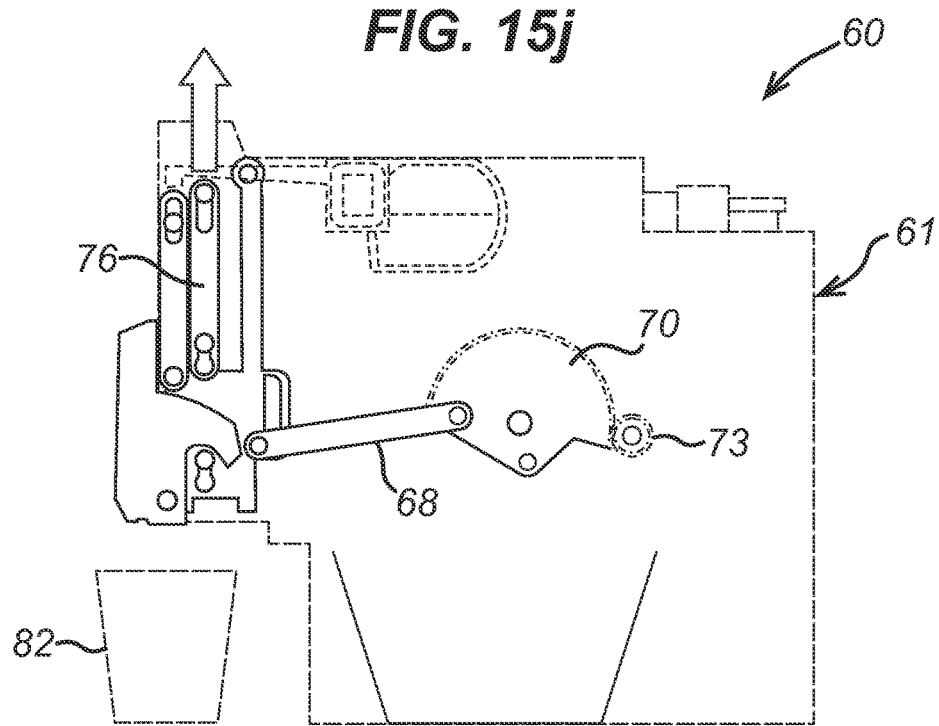
Figure 15K:
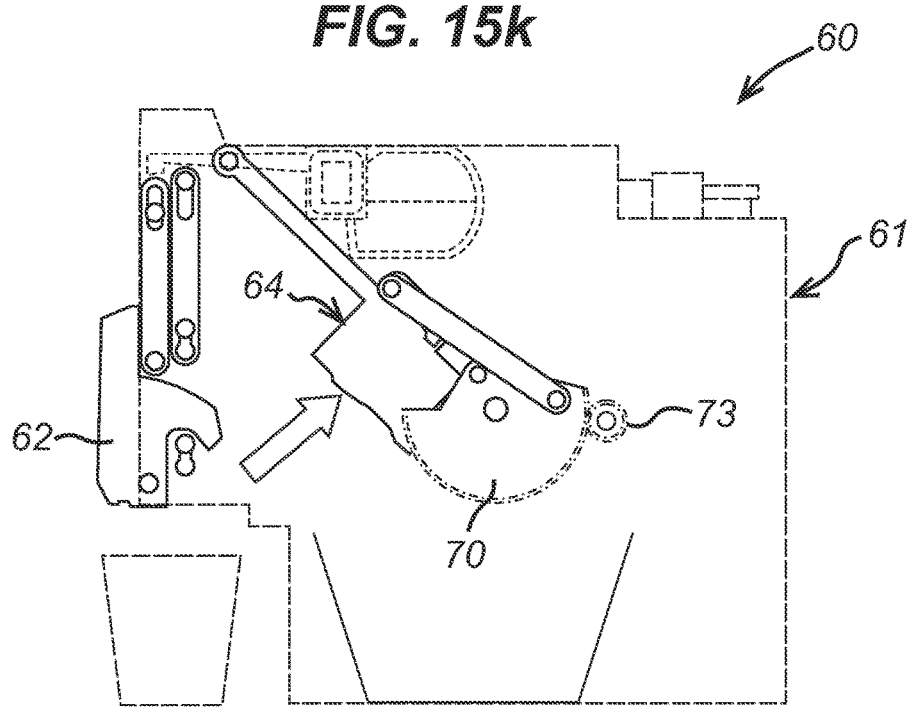
Figure 15L:
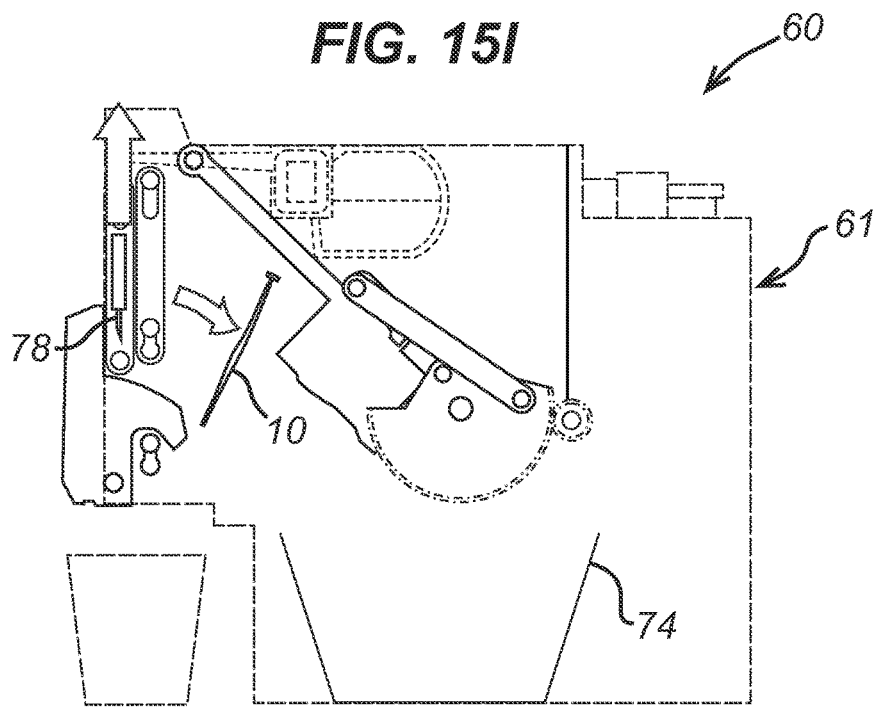

When the water injection is complete, the motor is actuated briefly again in the forward direction to drive the crank arm 68, drive pin 67, and thereby the piston in the direction of closure as shown in FIG. 15i. This causes the elastomeric layer on the second clamp member again to bulge into the capsule chamber, thereby squeezing the capsule to expel further beverage from the capsule (this is also referred to as dewatering the capsule). This motion of the piston also releases the locking pins on the piston and the first clamp member from abutment with the locking gates. The locking gates are then lifted as shown by movement of the mechanism 76 in FIG. 15j, and the injection tube is retracted. The motor is then actuated in the reverse direction to swing the second clamp member away from the first clamp member as shown in FIG. 15k. This opens the back of the clamp and allows the capsule disposal mechanism (not shown) to fling the spent capsule into a bin 74 inside the apparatus, as shown in FIG. 15l. The apparatus is then in the condition shown in FIG. 15m, ready for removal of the cup 82 containing the beverage after which the process can be repeated. It will be appreciated that the substantially the same sequence can be utilised when the clamp chamber is locked using the top dead centre arrangement of the drive mechanism, rather than the locking mechanism of FIGS. 7 and 8.

Figure 16:
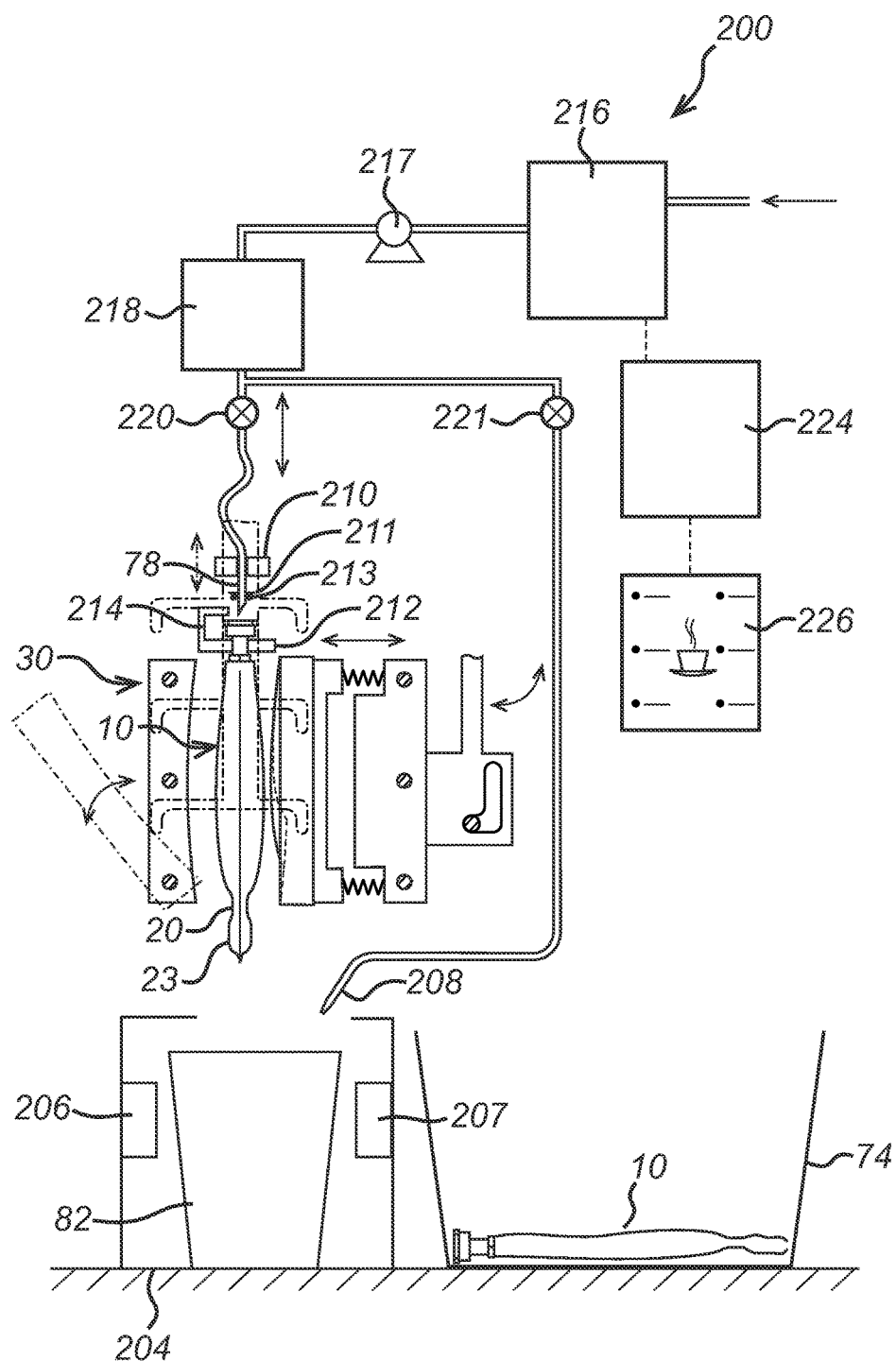
FIG. 16 shows a schematic diagram of a beverage preparation apparatus according to the invention.

FIG. 16 shows a schematic partial view of a beverage preparation apparatus 200 according to the invention. The apparatus 200 comprises a clamp assembly 30 similar to that described above in relation to FIGS. 7 and 8. The first (front) clamp member is pivoted at the bottom by a pivot that allows the first clamp member to swing outwardly for loading of a capsule 10 according to the invention into the clamp. The capsule 10 is loaded into the clamp by inserting the nozzle of the capsule through a key way 214 in the front of the apparatus. After passing through the key way 214, the capsule nozzle slots into the position shown in FIG. 16 in which the flange of the capsule nozzle rests on a support 212 having a slot through which the nozzle tube extends. The outlet channel 20 from the beverage ingredient chamber of the capsule is pinched by the bottom of the clamp assembly. The outlet chamber 20 and releasable bottom edge seal 23 of the capsule extend below the clamp assembly, thereby ensuring that there is no contamination of the clamp by the beverage during the preparation and dispensing process. The apparatus 200 may further comprise a heat source (not shown), such as a hot air or radiant heat source, located adjacent to the releasable bottom edge seal 23 of the capsule below the clamp to heat the releasable bottom edge seal 23 to assist opening of the capsule.

The clamp assembly 30 further comprises a second clamp member and locking elements as hereinbefore described. The sequence of the drive mechanism for the second clamp member is described above in relation to FIGS. 15a to 15m.

The apparatus of FIG. 16 further comprises a cup receiving station situated below the clamp, in the form of an alcove having a shelf 204 for supporting the cup 82. An infrared transmitter 206 and an infrared detector 207 are situated on opposite sides of the alcove, whereby the presence of a cup 82 in the cup receiving station interrupts the infrared beam between the transmitter 206 and the receiver 207 to provide a cup detection function. A disposal bin 74 is also provided inside the apparatus for receiving spent capsules 10 after beverage preparation. The apparatus according to this embodiment further comprises a mechanism (not shown) to fling the spent capsules 10 into the bin 74 after beverage preparation is complete and after retraction of the second clamp member. This mechanism may be similar to the corresponding mechanism used in existing FLAVIA beverage machines.

The apparatus 200 further comprises a liquid injection tube 78 in the form of a metal tube having a sharpened tip for piercing through the freshness barrier into the bore of the capsule nozzle to inject water into the capsule. The injection tube 78 forms a mating fit inside the bore of the capsule nozzle. The injection tube 78 is further provided with an O-ring 213 fitted around the tube and retained under a flange 211 on the injection tube. In use, the O-ring seats against the top of the capsule nozzle flange to form a pressure-tight seal between the injection tube and the capsule nozzle. The injection tube 78 is mounted on a reciprocating mechanism 210 to move the injection tube downwardly into the capsule nozzle prior to and during beverage preparation, and upwardly out of the way during capsule insertion and disposal.

The apparatus further comprises a jetting nozzle 208 for jetting water into the receptacle 82 in the cup receiving station. The jetting nozzle 208 is located slightly above the top of the receptacle, and at an angle to the vertical so that a jet of water from the nozzle swirls liquid inside the cup. The jetting nozzle may be a nozzle having a tapered internal bore, for example substantially as described in GB-A-2379624.

The apparatus further comprises a water tank 216 (which may be heated), a shuttle pump 217 capable of delivering water at pressures of 10-15 bar, and a hot block heater 218 for heating the pressurized water to the desired temperature of 90-100° C. Downstream of the hot block heater 218 the water conduit bifurcates into a first conduit leading through a valve 220 to the injection nozzle 78 of the clamp arrangement, and a second conduit leading through a valve 221 to the jet nozzle 208 for in-cup foaming or stirring. The apparatus may further comprise an air pump (not shown) for supplying air under pressure to either the injection tube conduit and/or to the jet nozzle conduit through suitable valves. The compressed air can be injected into the capsule after brewing to dewater the capsule after brewing. Alternatively or additionally, the pressurized air can be injected into the capsule before brewing to open the capsule immediately before water injection. Alternatively or additionally, the pressurized air can be used to clear the water conduits of liquid to eliminate drips and to prevent the build-up of scale in the water conduits.

The apparatus of FIG. 16 further comprises a control system 224 and a user interface 226. The control system 224 controls the pump 217, the heater 218, the valves 220,221, the clamp assembly opening and closing mechanisms, any hot air supply and valves, the capsule disposal mechanism, etc., in the sequences described herein to produce the desired beverages. The user interface 226 suitably comprises a display and appropriate soft keys or touch screen controls to enable the user to select the desired beverage and initiate the process.

Figure 17A:
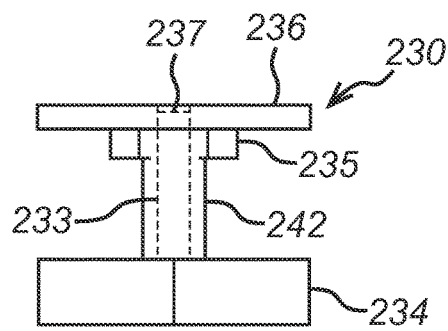
FIG. 17a shows a side elevation view of a first nozzle for a capsule according to the invention, incorporating a first key profile.
Figure 17B:
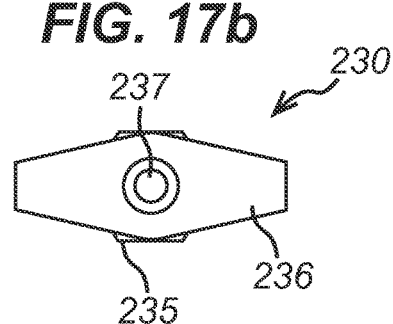

Referring to FIGS. 17a and 17b, a first key nozzle 230 for a capsule according to the present invention comprises a rhomboidal base 234, a tubular shaft 242, and a top flange made up of a first portion 235 shaped as a hexagonal prism, and an upper, second portion 236 that is lozenge-shaped. These components are suitably formed integrally by injection molding or 3D-printing. In the assembled capsule, the rhomboidal base is inserted and bonded between the front and back sheets of the capsule in the top edge of the capsule. A tubular bore 233 extends through all of these components for receiving the water injection tube of the brewer in use. The bore 233 is sealed by a transverse freshness barrier 237, which may be molded integrally with the other components of the nozzle as a frangible barrier, or may be a membrane of different material bonded across the top of the bore.

Figure 18A:
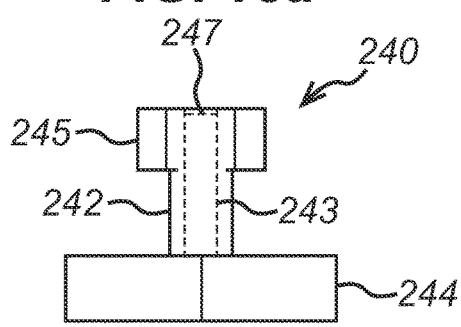
FIG. 18a shows a side elevation view of a second nozzle for a capsule according to the invention, incorporating a second key profile.
Figure 18B:
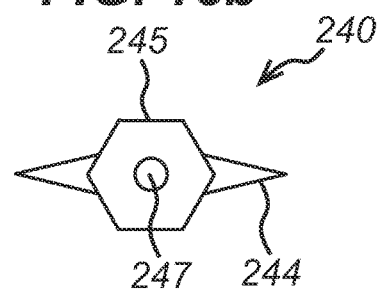

Referring to FIGS. 18a and 18b, a second key nozzle 240 for a capsule according to the present invention comprises a rhomboidal base 244, a tubular shaft 242, and a flange 245 shaped as a hexagonal prism. These components are suitably formed integrally by injection molding or 3D-printing. In the assembled capsule, the rhomboidal base 244 is inserted and bonded between the front and back sheets of the capsule in the top edge of the capsule. A tubular bore 243 extends through all of these components for receiving the water injection tube of the brewer in use. The bore is sealed by a transverse freshness seal 247, which may be molded integrally with the other components of the nozzle as a frangible barrier, or may be a membrane of different material bonded across the top of the bore. The hexagonal prism flange 245 of the nozzle of FIGS. 18a and 18b is thicker when measured along the principal axis of the prism than the hexagonal prism flange of the nozzle of FIGS. 17a and 17b.

Figure 19A:
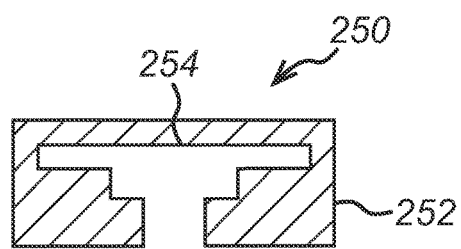
FIG. 19a shows a transverse cross-section through a first key way in a beverage preparation apparatus according to the present invention for insertion of a capsule incorporating a nozzle as shown in FIGS. 17a and 17b.
Figure 19B:
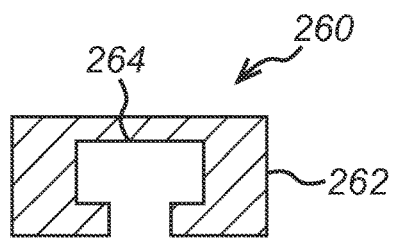
FIG. 19b shows a transverse cross-section through a second key way in a beverage preparation apparatus according to the present invention for insertion of a capsule incorporating a nozzle as shown in FIGS. 18a and 18b.

FIGS. 19a and 19b show transverse cross sections through first and second key ways 250,260 on first and second brewer clamp assemblies for receiving capsules having nozzles in accordance with FIGS. 17a and 17b, and FIGS. 18a and 18b, respectively. It can readily be seen that the nozzles 230 of FIGS. 17a and 17b will fit through the key way 254 of FIG. 19a but not through the key way 260 of FIG. 19b. Likewise, the nozzles 240 of FIGS. 18a and 18b will fit through the key way 260 of FIG. 19b but not through the key way 250 of FIG. 19a. Suitably, capsules for use in the high pressure brewing clamps as described herein having an outlet channel pinched by the clamp are provided with a first key nozzle type, and capsules for use in low pressure brewing clamps having a larger outlet channel, such as conventional FLAVIA capsules for use in conventional FLAVIA type brewing clamps, have a second key nozzle type, whereby the key ways associated with the respective clamps prevent misuse of capsules.

It will be appreciated that, for economy of the description, the preferred and alternative features have in some cases been described in relation to only one aspect of the invention even though they are applicable to all of the other aspects. Accordingly, any feature that has been described above in relation to any one aspect of the invention may also be applied to any other aspect of the invention.

The above embodiments have been described by way of example only. Many other embodiments falling within the scope of the accompanying claims will be apparent to the skilled reader.

The invention claimed is:

1. A beverage preparation apparatus for preparing a beverage by injection of pressurized water into a capsule having at least one flexible wall, said beverage preparation apparatus including a clamp assembly operable between an open configuration and a closed brewing configuration for beverage preparation, said clamp assembly comprising:
   a first clamp member having a recess in an inner wall thereof for receiving part of the capsule;
   a second clamp member comprising a rigid peripheral frame having a central void, and a resilient layer extending across said central void, whereby a front surface of said resilient layer defines a second inner wall for receiving part of the capsule, wherein respective inner walls of said first and second clamp members in said closed brewing configuration define a chamber for enclosing and supporting the capsule during beverage preparation; and
   a piston positioned in the central void of the rigid frame, said piston comprising a piston face for abutting a back surface of said resilient layer and a piston body, wherein said piston is resiliently coupled to said rigid peripheral frame to allow limited resilient movement of said rigid frame relative to said piston along a direction of closure of the clamp assembly.

2. The beverage preparation apparatus according to claim 1, wherein the clamp assembly further comprises a securing mechanism operable between an unlocked configuration and a locked configuration for locking the first clamp member in the closed brewing configuration.

3. The beverage preparation apparatus according to claim 1, wherein said clamp assembly further comprises a drive mechanism coupled to the piston for driving the second clamp member into the closed brewing configuration against the first clamp member.

4. The beverage preparation apparatus according to claim 3, wherein said drive mechanism comprises a crankshaft and a crank arm, said crankshaft rotating about a crankshaft centre and said crankshaft being pivotingly connected to a first end of said crank arm at a first pivot point, and said piston being pivotingly connected to a second end of said crank arm at a second pivot point.

5. The beverage preparation apparatus according to claim 4, wherein said crankshaft is a toothed crankshaft having a crank axle and said crank axle is mounted to the chassis of the apparatus and extends substantially perpendicular to the direction of closure of the clamp, and wherein the toothed crankshaft is driven by a toothed drive wheel coupled to an electric motor.

6. The beverage preparation apparatus according to claim 1, further comprising a locking mechanism for securing the first clamp member to the second clamp member in the closed brewing configuration when the locking mechanism is in a locked position.

7. The beverage preparation apparatus according to claim 6, wherein said locking mechanism permits displacement of the piston towards said first clamp member when the locking mechanism is in the locked position.

8. The A beverage preparation apparatus according to claim 1, wherein said piston is supported on an arm that is pivotingly connected to a chassis of the apparatus whereby said piston can be swung away from said first clamp member about an axis substantially perpendicular to the direction of closure of the second clamp member.

9. The beverage preparation apparatus according to claim 1, wherein said front surface of said resilient layer comprises a concave base surface for receiving said capsule and one or more pressure pads projecting from said concave base surface for selectively constricting one or more regions of the capsule held in the second clamp member.

10. The beverage preparation apparatus according to claim 1, wherein said piston comprises a peripheral flange behind the rigid frame, and said resilient coupling between the piston and the rigid peripheral frame comprises a plurality of springs spaced around the rigid peripheral frame and the peripheral flange of said piston, whereby relative movement of the piston towards or away from the rigid frame respectively compresses or extends the springs.

11. The beverage preparation apparatus according to claim 1, further comprising: a cup receiving station for locating a cup to receive a beverage prepared in the clamp assembly, and a water jet nozzle located above the cup receiving station to direct a jet of water into the cup in the cup receiving station.

12. The beverage preparation apparatus according to claim 1, further comprising a control system and a user display, wherein the control system and user display are programmed to offer a user a choice between a homogeneous beverage such as latte and an inhomogeneous beverage such as cappuccino, and to inject water into the beverage in the cup after beverage preparation in the clamp assembly to swirl and mix the beverage in the cup in response to a command to prepare a homogenous beverage.

13. The beverage preparation apparatus according to claim 1, further comprising a capsule recognition device and a control system and a user display programmed to interrupt beverage preparation and to indicate to a user when a capsule of the wrong type has been inserted in the clamp assembly.

14. The beverage preparation apparatus according to claim 1, further comprising a cup receiving station for locating a cup to receive beverage prepared in said clamp assembly, wherein said cup receiving station comprises a cup detection apparatus comprising an infrared transmitter and an infrared receiver located such that a cup positioned in the cup receiving station interrupts an infrared beam between said infrared transmitter and said infrared receiver to detect the presence of the cup in the cup receiving station, wherein a control system and a user display are programmed to perform the following steps when the cup detection apparatus does not detect a cup in the cup receiving station: (a) interrupt beverage preparation, and (b) prompt the user to perform one of the following options: either (i) insert a cup into the cup receiving station, or (ii) override the cup detection function.

15. The beverage preparation apparatus according to claim 1, further comprising an injector tube for injecting water into the capsule held inside the clamp assembly, and a pump for pumping said water through said injector at a pressure greater than about 5 bar gauge.

* * * * *